(12) United States Patent
Pickering

(10) Patent No.: US 12,398,574 B2
(45) Date of Patent: Aug. 26, 2025

(54) ADHESIVE APPLICATION SYSTEM

(71) Applicant: FASTBRICK IP PTY LTD, High Wycombe (AU)

(72) Inventor: Samuel Thomas Pickering, Kalamunda (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 174 days.

(21) Appl. No.: 18/004,277

(22) PCT Filed: Jul. 8, 2021

(86) PCT No.: PCT/AU2021/050732
§ 371 (c)(1),
(2) Date: Jan. 4, 2023

(87) PCT Pub. No.: WO2022/006635
PCT Pub. Date: Jan. 13, 2022

(65) Prior Publication Data
US 2024/0328180 A1  Oct. 3, 2024

(30) Foreign Application Priority Data
Jul. 8, 2020  (AU) ................ 2020902367

(51) Int. Cl.
*E04G 21/22*  (2006.01)
*B25J 15/00*  (2006.01)
(Continued)

(52) U.S. Cl.
CPC .......... *E04G 21/22* (2013.01); *B25J 15/0061* (2013.01); *B25J 15/0066* (2013.01);
(Continued)

(58) Field of Classification Search
CPC ...... E04G 21/20; E04G 21/22; B25J 15/0061; B25J 15/0066; B25J 15/008; B25J 18/025; E04F 21/023
(Continued)

(56) References Cited

U.S. PATENT DOCUMENTS 428,096 A * 5/1890 Hathaway ............... F23D 14/16
431/328
1,411,172 A * 3/1922 Kaye ....................... E04G 21/22
414/792.5
(Continued)

FOREIGN PATENT DOCUMENTS

AU        645640 B2    1/1994
CH        673498 A     3/1990
(Continued)

OTHER PUBLICATIONS

Boston Dynamics: "Introducing Spot (previously SpotMini)", Jun. 28, 2016, YouTube video, 1 page (screenshot of video); video retrieved at <https://www.youtube.com/watch?v=tf7IEVTDjng>.
(Continued)

*Primary Examiner* — James M Ference
(74) *Attorney, Agent, or Firm* — Perkins Coie LLP

(57) ABSTRACT

An adhesive application system for an automated block laying machine, the adhesive application system including: (a) an adhesive supply; and, (b) an adhesive applicator including: (i) a container for storing an adhesive reservoir received from the adhesive supply via an adhesive supply line; (ii) a lid mounted to the container so as to substantially cover the adhesive reservoir; and, (iii) an adhesive roller rotatably coupled to the container so that upon rotation adhesive from the reservoir is entrained up and around at least a portion of the adhesive roller, wherein, in use, adhesive is transferred from the adhesive roller onto a
(Continued)

bottom surface of a block as the block is moved across the roller.

21 Claims, 28 Drawing Sheets

(51) Int. Cl.
 *B25J 18/02* (2006.01)
 *E04G 21/20* (2006.01)
(52) U.S. Cl.
 CPC ............ *B25J 15/008* (2013.01); *B25J 18/025* (2013.01); *E04G 21/20* (2013.01)
(58) Field of Classification Search
 USPC ..................................................... 52/749.14
 See application file for complete search history.

(56) References Cited

U.S. PATENT DOCUMENTS

| | | | |
|---|---|---|---|
| 1,633,192 A | 6/1927 | Reagan | |
| 1,829,435 A | 10/1931 | Barnhart | |
| 2,072,663 A * | 3/1937 | Bedford | A21C 15/002 |
| | | | 219/421 |
| 2,599,552 A * | 6/1952 | Harney | E04G 21/22 |
| | | | 414/792.5 |
| 3,162,886 A * | 12/1964 | Wise | E04G 21/204 |
| | | | 401/35 |
| 3,438,171 A | 4/1969 | Demarest | |
| 3,746,570 A * | 7/1973 | McIntosh | B05C 11/10 |
| | | | 427/208.2 |
| 3,757,484 A | 9/1973 | Williamson et al. | |
| 3,786,966 A * | 1/1974 | Behunin | E04G 21/202 |
| | | | 401/187 |
| 3,790,428 A | 2/1974 | Lingl | |
| 3,791,559 A * | 2/1974 | Foye | E04G 21/204 |
| | | | 222/240 |
| 3,834,973 A * | 9/1974 | Kummerow | E04C 2/042 |
| | | | 156/182 |
| RE28,305 E | 1/1975 | Williamson et al. | |
| 3,930,929 A | 1/1976 | Lingl | |
| 3,950,914 A | 4/1976 | Lowen | |
| 4,033,463 A | 7/1977 | Cervin | |
| 4,039,170 A * | 8/1977 | Cornwell | A62C 5/00 |
| | | | 366/29 |
| 4,043,487 A * | 8/1977 | Price | E04G 21/204 |
| | | | 425/456 |
| 4,067,766 A * | 1/1978 | Larger | E04C 2/042 |
| | | | 52/749.14 |
| 4,106,259 A | 8/1978 | Taylor-smith | |
| 4,135,651 A * | 1/1979 | Hession | E04G 21/204 |
| | | | 401/48 |
| 4,221,258 A | 9/1980 | Richard | |
| 4,245,451 A | 1/1981 | Taylor-smith | |
| 4,303,363 A | 12/1981 | Cervin | |
| 4,523,100 A | 6/1985 | Payne | |
| 4,634,347 A * | 1/1987 | Gauffin | E04G 21/20 |
| | | | 417/900 |
| 4,635,985 A | 1/1987 | Rooke | |
| 4,708,562 A | 11/1987 | Melan et al. | |
| 4,714,339 A | 12/1987 | Lau | |
| 4,758,036 A | 7/1988 | Legille et al. | |
| 4,765,789 A | 8/1988 | Lonardi et al. | |
| 4,790,651 A | 12/1988 | Brown et al. | |
| 4,827,689 A | 5/1989 | Lonardi et al. | |
| 4,829,737 A * | 5/1989 | Anliker | E04G 21/22 |
| | | | 52/749.14 |
| 4,852,237 A | 8/1989 | Tradt et al. | |
| 4,911,595 A | 3/1990 | Kirchen et al. | |
| 4,945,493 A | 7/1990 | Huang et al. | |
| 4,952,772 A | 8/1990 | Zana | |
| 4,954,762 A | 9/1990 | Miyake et al. | |
| 4,969,789 A | 11/1990 | Searle | |
| 5,004,844 A | 4/1991 | Van Leeuwen et al. | |
| 5,013,986 A | 5/1991 | Gauggel | |
| 5,018,923 A | 5/1991 | Melan et al. | |
| 5,035,352 A * | 7/1991 | Mania | E04G 21/20 |
| | | | 222/614 |
| 5,049,797 A | 9/1991 | Phillips | |
| 5,080,415 A | 1/1992 | Bjornson | |
| 5,193,723 A * | 3/1993 | Everett | E04G 21/20 |
| | | | 222/615 |
| 5,196,900 A | 3/1993 | Pettersen | |
| 5,284,000 A | 2/1994 | Milne et al. | |
| 5,321,353 A | 6/1994 | Furness | |
| 5,403,140 A | 4/1995 | Carmichael et al. | |
| 5,413,454 A | 5/1995 | Movsesian | |
| 5,419,669 A | 5/1995 | Kremer et al. | |
| 5,420,489 A | 5/1995 | Hansen et al. | |
| 5,469,531 A | 11/1995 | Faure et al. | |
| 5,497,061 A | 3/1996 | Nonaka et al. | |
| 5,523,663 A | 6/1996 | Tsuge et al. | |
| 5,527,145 A | 6/1996 | Duncan | |
| 5,557,397 A | 9/1996 | Hyde et al. | |
| 5,581,975 A | 12/1996 | Trebbi | |
| 5,681,125 A * | 10/1997 | Amaya | E04G 21/20 |
| | | | 401/265 |
| 5,737,500 A | 4/1998 | Seraji et al. | |
| 5,743,374 A | 4/1998 | Monsees | |
| 5,838,882 A | 11/1998 | Gan et al. | |
| 5,878,921 A * | 3/1999 | Chase | E04F 21/08 |
| | | | 222/626 |
| 5,895,690 A | 4/1999 | Greisel | |
| 6,018,923 A | 2/2000 | Wendt | |
| 6,049,377 A | 4/2000 | Lau et al. | |
| 6,101,455 A | 8/2000 | Davis | |
| 6,112,955 A * | 9/2000 | Lang | E04G 21/20 |
| | | | 222/413 |
| 6,134,507 A | 10/2000 | Markey, Jr. et al. | |
| 6,166,809 A | 12/2000 | Pettersen et al. | |
| 6,166,811 A | 12/2000 | Long et al. | |
| 6,170,221 B1 * | 1/2001 | Behunin | E04G 21/20 |
| | | | 52/745.1 |
| 6,172,754 B1 | 1/2001 | Niebuhr | |
| 6,213,309 B1 | 4/2001 | Dadisho | |
| 6,285,959 B1 | 9/2001 | Greer | |
| 6,310,644 B1 | 10/2001 | Keightley | |
| 6,330,503 B1 | 12/2001 | Sharp et al. | |
| 6,370,837 B1 | 4/2002 | Mcmahon et al. | |
| 6,427,122 B1 | 7/2002 | Lin | |
| 6,429,016 B1 | 8/2002 | Mcneil | |
| 6,512,993 B2 | 1/2003 | Kacyra et al. | |
| 6,516,272 B2 | 2/2003 | Lin | |
| 6,584,378 B1 | 6/2003 | Anfindsen | |
| 6,611,141 B1 | 8/2003 | Schulz | |
| 6,618,496 B1 | 9/2003 | Tassakos et al. | |
| 6,628,322 B1 | 9/2003 | Cerruti | |
| 6,643,002 B2 | 11/2003 | Drake, Jr. | |
| 6,664,529 B2 | 12/2003 | Pack et al. | |
| 6,681,145 B1 | 1/2004 | Greenwood et al. | |
| 6,683,694 B2 | 1/2004 | Cornil | |
| 6,704,619 B1 | 3/2004 | Coleman et al. | |
| 6,741,364 B2 | 5/2004 | Lange et al. | |
| 6,825,937 B1 | 11/2004 | Gebauer et al. | |
| 6,850,946 B1 | 2/2005 | Rappaport et al. | |
| 6,859,729 B2 | 2/2005 | Breakfield et al. | |
| 6,864,966 B2 | 3/2005 | Giger | |
| 6,868,847 B2 | 3/2005 | Ainedter et al. | |
| 6,873,880 B2 | 3/2005 | Hooke et al. | |
| 6,917,893 B2 | 7/2005 | Dietsch et al. | |
| 6,935,036 B2 | 8/2005 | Barber et al. | |
| 6,957,496 B2 | 10/2005 | Raab et al. | |
| 6,965,843 B2 | 11/2005 | Hobden et al. | |
| 6,970,802 B2 | 11/2005 | Ban et al. | |
| 6,996,912 B2 | 2/2006 | Raab et al. | |
| 7,050,930 B2 | 5/2006 | Hobden et al. | |
| 7,051,450 B2 | 5/2006 | Barber et al. | |
| 7,069,664 B2 | 7/2006 | Barber et al. | |
| 7,107,144 B2 | 9/2006 | Capozzi et al. | |
| 7,111,437 B2 | 9/2006 | Ainedter | |
| 7,130,034 B2 | 10/2006 | Barvosa-carter et al. | |
| 7,142,981 B2 | 11/2006 | Hablani | |

(56) References Cited

U.S. PATENT DOCUMENTS

| | | |
|---|---|---|
| 7,145,647 B2 | 12/2006 | Suphellen et al. |
| 7,153,454 B2 | 12/2006 | Khoshnevis |
| 7,174,651 B2 | 2/2007 | Barber et al. |
| 7,230,689 B2 | 6/2007 | Lau |
| 7,246,030 B2 | 7/2007 | Raab et al. |
| 7,269,910 B2 | 9/2007 | Raab et al. |
| 7,347,311 B2 | 3/2008 | Rudge |
| 7,519,493 B2 | 4/2009 | Atwell et al. |
| 7,551,121 B1 | 6/2009 | Oconnell et al. |
| 7,564,538 B2 | 7/2009 | Sakimura et al. |
| 7,570,371 B1 | 8/2009 | Storm |
| 7,576,836 B2 | 8/2009 | Bridges |
| 7,576,847 B2 | 8/2009 | Bridges |
| 7,591,078 B2 | 9/2009 | Crampton |
| 7,639,347 B2 | 12/2009 | Eaton |
| 7,693,325 B2 | 4/2010 | Pulla et al. |
| 7,701,587 B2 | 4/2010 | Shioda et al. |
| 7,743,586 B2 * | 6/2010 | Hancock ............... E04B 2/16 222/614 |
| 7,774,159 B2 | 8/2010 | Cheng et al. |
| 7,800,758 B1 | 9/2010 | Bridges et al. |
| 7,804,602 B2 | 9/2010 | Raab |
| RE42,055 E | 1/2011 | Raab et al. |
| RE42,082 E | 2/2011 | Raab et al. |
| 7,881,896 B2 | 2/2011 | Atwell et al. |
| 7,967,549 B2 | 6/2011 | Geist et al. |
| 7,993,289 B2 | 8/2011 | Quistgaard et al. |
| 8,036,452 B2 | 10/2011 | Pettersson et al. |
| 8,054,451 B2 | 11/2011 | Karazi et al. |
| 8,060,344 B2 | 11/2011 | Stathis |
| 8,145,446 B2 | 3/2012 | Atwell et al. |
| 8,166,727 B2 | 5/2012 | Pivac et al. |
| 8,169,604 B2 | 5/2012 | Braghiroli et al. |
| 8,185,240 B2 | 5/2012 | Williams et al. |
| 8,229,208 B2 | 7/2012 | Pulla et al. |
| 8,233,153 B2 | 7/2012 | Knuettel |
| 8,244,030 B2 | 8/2012 | Pettersson et al. |
| 8,248,620 B2 | 8/2012 | Wicks et al. |
| 8,269,984 B2 | 9/2012 | Hinderling et al. |
| 8,327,555 B2 | 12/2012 | Champ |
| 8,337,407 B2 | 12/2012 | Quistgaard et al. |
| 8,345,926 B2 | 1/2013 | Clark et al. |
| 8,346,392 B2 | 1/2013 | Walser et al. |
| 8,405,716 B2 | 3/2013 | Yu et al. |
| 8,467,072 B2 | 6/2013 | Cramer et al. |
| 8,537,372 B2 | 9/2013 | Siercks et al. |
| 8,537,376 B2 | 9/2013 | Day et al. |
| 8,558,992 B2 | 10/2013 | Steffey |
| 8,593,648 B2 | 11/2013 | Cramer et al. |
| 8,595,948 B2 | 12/2013 | Raab et al. |
| 8,606,399 B2 | 12/2013 | Williams et al. |
| 8,634,950 B2 | 1/2014 | Simonetti et al. |
| 8,644,964 B2 | 2/2014 | Hendron et al. |
| 8,668,074 B2 | 3/2014 | Davidson |
| 8,670,114 B2 | 3/2014 | Bridges et al. |
| 8,677,643 B2 | 3/2014 | Bridges et al. |
| 8,792,709 B2 | 7/2014 | Pulla et al. |
| 8,803,055 B2 | 8/2014 | Lau et al. |
| 8,812,155 B2 | 8/2014 | Brethe |
| 8,825,208 B1 * | 9/2014 | Benson ............... E04F 21/02 700/247 |
| 8,832,954 B2 | 9/2014 | Atwell et al. |
| 8,848,203 B2 | 9/2014 | Bridges et al. |
| 8,875,409 B2 | 11/2014 | Kretschmer et al. |
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,028,908 B1 * | 5/2015 | DeTar ............... C23C 2/185 427/119 |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,157,246 B2 * | 10/2015 | Campbell ............. E04G 21/202 |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,266,238 B2 | 2/2016 | Huettenhofer |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,405,293 B2 | 8/2016 | Meuleau |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,481,007 B2 * | 11/2016 | Rzonca ............... B05C 11/1002 |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,757,859 B1 | 9/2017 | Kolb et al. |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,353 B2 | 6/2018 | Bartmann et al. |
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |

(56) References Cited

U.S. PATENT DOCUMENTS

| | | |
|---|---|---|
| 10,073,162 B2 | 9/2018 | Charvat et al. |
| 10,074,889 B2 | 9/2018 | Charvat et al. |
| 10,082,521 B2 | 9/2018 | Atlas et al. |
| 10,090,944 B1 | 10/2018 | Charvat et al. |
| 10,094,909 B2 | 10/2018 | Charvat et al. |
| 10,126,415 B2 | 11/2018 | Becker et al. |
| 10,189,176 B2 | 1/2019 | Williams |
| 10,220,511 B2 | 3/2019 | Linnell et al. |
| 10,240,949 B2 | 3/2019 | Peters et al. |
| 10,315,904 B2 | 6/2019 | Landler |
| 10,635,758 B2 * | 4/2020 | Pivac .................... B25J 19/022 |
| 10,865,578 B2 | 12/2020 | Pivac et al. |
| 10,876,308 B2 | 12/2020 | Pivac et al. |
| 11,106,836 B2 * | 8/2021 | Pivac .................... B28D 7/005 |
| 11,401,115 B2 | 8/2022 | Pivac et al. |
| 2002/0030145 A1 * | 3/2002 | Lang .................... E04G 21/025 |
| | | 248/131 |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1 | 6/2003 | Hooke et al. |
| 2003/0206285 A1 | 11/2003 | Lau |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1 | 11/2005 | Matsufuji |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2009/0038258 A1 | 2/2009 | Pivac et al. |
| 2009/0074979 A1 | 3/2009 | Krogedal et al. |
| 2010/0025349 A1 | 2/2010 | Khoshnevis |
| 2010/0138185 A1 | 6/2010 | Kang |
| 2010/0274390 A1 | 10/2010 | Walser et al. |
| 2010/0281822 A1 | 11/2010 | Murray |
| 2011/0066393 A1 | 3/2011 | Groll et al. |
| 2011/0153524 A1 | 6/2011 | Schnackel |
| 2011/0208347 A1 | 8/2011 | Otake et al. |
| 2012/0038074 A1 | 2/2012 | Khoshnevis |
| 2012/0099096 A1 | 4/2012 | Bridges et al. |
| 2012/0136524 A1 | 5/2012 | Everett et al. |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1 | 4/2013 | Huettenhofer |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2014/0002608 A1 | 1/2014 | Atwell et al. |
| 2014/0067121 A1 | 3/2014 | Brooks et al. |
| 2014/0076923 A1 * | 3/2014 | Clark .................... B05C 11/1042 |
| | | 73/304 C |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |
| 2014/0348388 A1 | 11/2014 | Metzler et al. |
| 2014/0366481 A1 | 12/2014 | Benson |
| 2015/0082740 A1 | 3/2015 | Peters et al. |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0158181 A1 | 6/2015 | Kawamura et al. |
| 2015/0241203 A1 | 8/2015 | Jordil et al. |
| 2015/0258694 A1 | 9/2015 | Hand et al. |
| 2015/0276402 A1 | 10/2015 | Grsser et al. |
| 2015/0280829 A1 | 10/2015 | Breuer |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |
| 2016/0005185 A1 | 1/2016 | Geissler |
| 2016/0093099 A1 | 3/2016 | Bridges |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0223364 A1 | 8/2016 | Peters et al. |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0313114 A1 | 10/2016 | Tohme et al. |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0066157 A1 | 3/2017 | Peters et al. |
| 2017/0067739 A1 | 3/2017 | Siercks et al. |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122733 A1 | 5/2017 | Brown |
| 2017/0122736 A1 | 5/2017 | Dold et al. |
| 2017/0166399 A1 | 6/2017 | Stubbs |
| 2017/0173796 A1 | 6/2017 | Kim et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0191822 A1 | 7/2017 | Becker et al. |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |
| 2017/0307757 A1 | 10/2017 | Hinderling et al. |
| 2017/0314909 A1 | 11/2017 | Dang |
| 2017/0314918 A1 | 11/2017 | Shah |
| 2017/0333137 A1 | 11/2017 | Roessler |
| 2017/0343336 A1 | 11/2017 | Lettau |
| 2018/0003493 A1 | 1/2018 | Bernhard et al. |
| 2018/0017384 A1 | 1/2018 | Siercks et al. |
| 2018/0023935 A1 | 1/2018 | Atwell et al. |
| 2018/0038684 A1 | 2/2018 | Fröhlich et al. |
| 2018/0046096 A1 | 2/2018 | Shibazaki |
| 2018/0052233 A1 | 2/2018 | Frank et al. |
| 2018/0108178 A1 | 4/2018 | Murugappan et al. |
| 2018/0121571 A1 | 5/2018 | Tiwari et al. |
| 2018/0149469 A1 | 5/2018 | Becker et al. |
| 2018/0156601 A1 | 6/2018 | Pontai |
| 2018/0170719 A1 | 6/2018 | Tasch et al. |
| 2018/0180416 A1 | 6/2018 | Edelman et al. |
| 2018/0202796 A1 | 7/2018 | Ziegenbein |
| 2018/0209156 A1 | 7/2018 | Pettersson |
| 2018/0239010 A1 | 8/2018 | Mindell et al. |
| 2018/0300433 A1 | 10/2018 | Maxam et al. |
| 2019/0026401 A1 | 1/2019 | Benjamin et al. |
| 2019/0032348 A1 | 1/2019 | Parkes |
| 2019/0184555 A1 | 6/2019 | Linnell et al. |
| 2019/0224846 A1 | 7/2019 | Pivac et al. |

(56) References Cited

U.S. PATENT DOCUMENTS

| | | | |
|---|---|---|---|
| 2019/0251210 | A1 | 8/2019 | Pivac et al. |
| 2019/0316369 | A1* | 10/2019 | Pivac .................. G05B 19/416 |
| 2020/0173777 | A1 | 6/2020 | Pivac et al. |
| 2020/0206923 | A1 | 7/2020 | Pivac et al. |
| 2020/0206924 | A1 | 7/2020 | Pivac et al. |
| 2020/0215688 | A1 | 7/2020 | Pivac et al. |
| 2020/0215692 | A1 | 7/2020 | Pivac et al. |
| 2020/0215693 | A1 | 7/2020 | Pivac et al. |
| 2021/0016437 | A1 | 1/2021 | Pivac et al. |
| 2021/0016438 | A1 | 1/2021 | Pivac et al. |
| 2021/0080582 | A1 | 3/2021 | Pivac et al. |
| 2021/0291362 | A1 | 9/2021 | Pivac et al. |
| 2021/0370509 | A1 | 12/2021 | Pivac et al. |
| 2021/0379775 | A1 | 12/2021 | Pivac et al. |
| 2021/0404195 | A1* | 12/2021 | Huth .................... B33Y 80/00 |
| 2022/0058300 | A1 | 2/2022 | Pivac et al. |
| 2023/0167650 | A1 | 6/2023 | Pickering et al. |
| 2024/0328180 | A1* | 10/2024 | Pickering ................ E04G 21/20 |

FOREIGN PATENT DOCUMENTS

| | | |
|---|---|---|
| CN | 2730976 Y | 10/2005 |
| CN | 2902981 Y | 5/2007 |
| CN | 2923903 Y | 7/2007 |
| CN | 101100903 A | 1/2008 |
| CN | 201184054 Y | 1/2009 |
| CN | 101360873 B | 2/2009 |
| CN | 101476883 A | 7/2009 |
| CN | 100557169 C | 11/2009 |
| CN | 101694130 A | 4/2010 |
| CN | 201972413 U | 9/2011 |
| CN | 102359282 A | 2/2012 |
| CN | 202248944 U | 5/2012 |
| CN | 202292752 U | 7/2012 |
| CN | 102995911 A | 3/2013 |
| CN | 202925913 U | 5/2013 |
| CN | 103363902 A | 10/2013 |
| CN | 103698769 A | 4/2014 |
| CN | 203701626 U | 7/2014 |
| CN | 104141391 B2 | 11/2014 |
| CN | 104153591 A | 11/2014 |
| CN | 104493810 A | 4/2015 |
| CN | 204295678 U | 4/2015 |
| CN | 104612411 A | 5/2015 |
| CN | 204311767 U | 5/2015 |
| CN | 103774859 B | 11/2015 |
| CN | 103753586 B | 12/2015 |
| CN | 105113373 A | 12/2015 |
| CN | 105178616 A | 12/2015 |
| CN | 105257008 B | 1/2016 |
| CN | 105544998 A | 5/2016 |
| CN | 205290958 U | 6/2016 |
| CN | 104806028 B | 11/2016 |
| CN | 205668271 U | 11/2016 |
| CN | 205840368 U | 12/2016 |
| CN | 205990775 U | 3/2017 |
| CN | 206185879 U | 5/2017 |
| CN | 206189878 U | 5/2017 |
| CN | 105089274 B | 6/2017 |
| CN | 105064699 B | 7/2017 |
| CN | 107217859 A | 9/2017 |
| CN | 107237483 A | 10/2017 |
| CN | 107357294 A | 11/2017 |
| CN | 107605167 A | 1/2018 |
| CN | 206838382 U | 1/2018 |
| CN | 206844687 U | 1/2018 |
| CN | 107654077 A | 2/2018 |
| CN | 107675891 A | 2/2018 |
| CN | 107740591 A | 2/2018 |
| CN | 106088632 B | 3/2018 |
| CN | 107762165 A | 3/2018 |
| CN | 207063553 U | 3/2018 |
| CN | 106088631 B | 5/2018 |
| CN | 107975245 A | 5/2018 |
| CN | 108061551 A | 5/2018 |
| CN | 108222527 A | 6/2018 |
| CN | 108301628 A | 7/2018 |
| CN | 108331362 A | 7/2018 |
| CN | 106150109 B | 8/2018 |
| CN | 108396977 A | 8/2018 |
| CN | 108457479 A | 8/2018 |
| CN | 108708560 A | 10/2018 |
| CN | 208023979 U | 10/2018 |
| CN | 106881711 A | 4/2019 |
| CN | 107083845 A | 6/2019 |
| CN | 108016585 B | 7/2019 |
| CN | 209701519 U | 11/2019 |
| DE | 3430915 C2 | 3/1986 |
| DE | 4038260 C2 | 6/1991 |
| DE | 4207384 A1 | 9/1993 |
| DE | 19509809 A1 | 10/1995 |
| DE | 4417928 A1 | 11/1995 |
| DE | 29601535 U1 | 5/1997 |
| DE | 19600006 A1 | 7/1997 |
| DE | 19603234 C2 | 9/1997 |
| DE | 19743717 C2 | 4/1999 |
| DE | 19849720 A1 | 5/2000 |
| DE | 10230021 C1 | 7/2003 |
| DE | 102006030130 B3 | 9/2007 |
| DE | 102009018070 A1 | 10/2010 |
| DE | 102009042014 A1 | 3/2011 |
| DE | 202012100646 U1 | 6/2013 |
| DE | 102013019869 A1 | 5/2015 |
| EP | 190076 A1 | 8/1986 |
| EP | 370682 A2 | 5/1990 |
| EP | 456020 A1 | 1/1995 |
| EP | 493020 B1 | 4/1995 |
| EP | 495525 B1 | 4/1995 |
| EP | 836664 B1 | 1/1999 |
| EP | 674069 B1 | 12/1999 |
| EP | 1918478 A2 | 5/2008 |
| EP | 2112291 A1 | 10/2009 |
| EP | 2219528 A1 | 8/2010 |
| EP | 2249997 A1 | 11/2010 |
| EP | 2353801 A2 | 8/2011 |
| EP | 2199719 B1 | 10/2014 |
| EP | 3084719 A1 | 10/2016 |
| ES | 2296556 A1 | 4/2008 |
| FR | 2230825 A1 | 12/1974 |
| FR | 2524522 A1 | 10/1983 |
| GB | 119331 A | 10/1918 |
| GB | 2198105 A | 5/1923 |
| GB | 673472 A | 6/1952 |
| GB | 682010 A | 11/1952 |
| GB | 839253 A | 6/1960 |
| GB | 1067604 A | 5/1967 |
| GB | 1465068 A | 2/1977 |
| GB | 2268536 A | 1/1994 |
| GB | 125079 | 12/2001 |
| GB | 2422400 A | 7/2006 |
| JP | 64006719 A | 1/1989 |
| JP | H07101509 A | 11/1999 |
| JP | 2000127077 A | 5/2000 |
| JP | 2005283600 A | 10/2005 |
| JP | 4294990 B2 | 4/2009 |
| JP | 2009521630 A | 6/2009 |
| JP | 5508895 B2 | 3/2014 |
| LU | 87054 A1 | 6/1989 |
| LU | 87381 A1 | 6/1990 |
| LU | 88144 A1 | 4/1994 |
| RU | 85392 U1 | 8/2009 |
| WO | 9702397 A1 | 1/1997 |
| WO | 2001076830 A1 | 10/2001 |
| WO | 2004020760 A1 | 3/2004 |
| WO | 2004083540 A3 | 9/2004 |
| WO | 2005014240 A1 | 2/2005 |
| WO | 2005017550 A2 | 2/2005 |
| WO | 2005070657 A1 | 8/2005 |
| WO | 2004011734 A1 | 11/2005 |
| WO | 2006111827 A1 | 10/2006 |
| WO | 2007076581 A1 | 7/2007 |
| WO | 2008124713 A2 | 10/2008 |
| WO | 2009026641 A1 | 3/2009 |
| WO | 2009026642 A1 | 3/2009 |

(56) References Cited

FOREIGN PATENT DOCUMENTS

| WO | 2009044002 | A1 | 4/2009 | |
| --- | --- | --- | --- | --- |
| WO | 2010020457 | A1 | 2/2010 | |
| WO | 2011077006 | A2 | 6/2011 | |
| WO | 2013088154 | A1 | 6/2013 | |
| WO | 2013134559 | A1 | 9/2013 | |
| WO | 2017162630 | A1 | 9/2017 | |
| WO | 2018009978 | A1 | 1/2018 | |
| WO | 2018009981 | A1 | 1/2018 | |
| WO | 2018009985 | A1 | 1/2018 | |
| WO | 2018009986 | A1 | 1/2018 | |
| WO | WO-2018009980 | A1 * | 1/2018 | ............ B25J 15/026 |
| WO | 2018052469 | A3 | 4/2018 | |
| WO | 2018099323 | A1 | 6/2018 | |
| WO | 2019006511 | A1 | 1/2019 | |
| WO | 2019014701 | A1 | 1/2019 | |
| WO | 2019014702 | A1 | 1/2019 | |
| WO | 2019014705 | A1 | 1/2019 | |
| WO | 2019014706 | A1 | 1/2019 | |
| WO | 2019014707 | A1 | 1/2019 | |
| WO | 2019033165 | A1 | 2/2019 | |
| WO | 2019033166 | A1 | 2/2019 | |
| WO | 2019033170 | A1 | 2/2019 | |
| WO | 2019068128 | A1 | 4/2019 | |
| WO | 2019071313 | A1 | 4/2019 | |
| WO | 2020014737 | A1 | 1/2020 | |
| WO | 2020047574 | A1 | 3/2020 | |
| WO | WO-2020136563 | A2 * | 7/2020 | ............. B25J 11/00 |
| WO | 2020210863 | A1 | 10/2020 | |
| WO | WO-2020193601 | A1 * | 10/2020 | ............. B33Y 10/00 |

OTHER PUBLICATIONS

Delgado, R. et al.: "Development and Control of an Omnidirectional Mobile Robot on an EtherCAT Network", International Journal of Applied Engineering Research, vol. 11, No. 21, 2016, pp. 10586-10592, XP055574484.

Dorfler, K. et al.: "Mobile Robotic Brickwork ', Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451.

Egerstedt, M. et al.: "Control of Mobile Platforms using a Virtual Vehicle Approach", IEEE Transactions on Automatic Control, vol. 46, No. 11, Nov. 2001 (Nov. 1, 2001), XP055567515.

Examination Report mailed Apr. 18, 2021 in GCC Patent Application No. 2018-35644, 5 pages.

Examination Report mailed Apr. 30, 2021 in GCC Patent Application No. 2018-35643, 3 pages.

Examination Report mailed Jun. 29, 2021 for India Patent Application No. 201927004006, 6 pages.

Examination Report mailed Sep. 30, 2021 for Australian Patent Application No. 2017295316, 3 pages.

Extended European Search Report mailed Jun. 4, 2021 for European Patent Application No. 18865644.1, 7 pages.

Extended European Search Report mailed Mar. 16, 2021 for European Patent Application No. 18834565.6, 19 pages.

Extended European Search Report mailed Mar. 17, 2021 for European Patent Application No. 18835861.8, 12 pages.

Extended European Search Report mailed Mar. 18, 2021 for European Patent Application No. 18834673.8, 14 pages.

Extended European Search Report mailed Mar. 18, 2021 for European Patent Application No. 18834893.2, 12 pages.

Extended European Search Report mailed Mar. 18, 2021 for European Patent Application No. 18835737.0, 10 pages.

Extended European Search Report mailed Mar. 30, 2021 for European Patent Application No. 18845794.9, 13 pages.

Extended European Search Report mailed Mar. 5, 2021 for European Patent Application No. 18828425.1, 7 pages.

Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015].

Fastbrick Robotics: Hadrian 105 Demonstrative Model Animation, Jun. 29, 2015 (Jun. 29, 2015), XP054979424, Retrieved from the Internet <URL:https://www.youtube.com/watch?v=Rebqcsb61gY> [retrieved on Mar. 7, 2018].

Fastbrick Robotics: Hadrian 105 Time Lapse, Fastbrick Robotics Time Lapse, May 22, 2016 (May 22, 2016), XP054978173, Retrieved from the Internet <URL:https://www.youtube.com/watch?v=4YcrO8ONcfY> [retrieved on May 22, 2016].

Fastbrick Robotics: Hadrian X Digital Construction System, published on Sep. 21, 2016 <URL: https://www.youtube.com/watch?v=5bW1vuCgEaA >.

Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454.

Gander H et al: "Application of a floating point digital signal processor to a dynamic robot measurement system", Instrumentation and Measurement Technology Conference, 1994. IMTC/94. Conference Proceedings. $10^{th}$ Anniversary. Advanced Technologies in I & M., 1994 IEEE Hamamatsu, Japan May 10-12, 1994, New York, NY, USA, IEEE, May 10, 1994 (May 10, 1994), pp. 372-375, XP010121924, DOI: 10.1109/IMTC.1994.352046, ISBN: 978-0-7803-1880-9, *whole document*.

Gao, X. et al.: "Complete Solution Classification for the Perspective-Three-Point Problem", IEEE Transactions on Pattern Analysis and Machine Intelligence, vol. 25, No. 8, Aug. 2003 (Aug. 1, 2003), pp. 930-943, XP011099374.

Garrido, S. et al., "FM2: A real-time fast marching sensor based motion planner", Advanced Intelliget Mechatronics, 2007 IEEE/ASME International Conference on, IEEE, PI, Sep. 1, 2007 (Sep. 1, 2007), pp. 1-6.

Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.

Heintze, H., "Design and Control of a Hydraulically Actuated Industrial Brick Laying Robot," 264 pages.

Heintze, J. et al., "Controlled hydraulics for a direct drive brick laying robot," Automation in Construction 5 (1996), pp. 23-29.

Helm, V. et al.: "Mobile Robotic Fabrication on Construction Sites: dimRob", IEEE /RSJ International Conference on Intelligent Robots and Systems, Oct. 7, 2012 (Oct. 7, 2012), Vilamoura, Portugal, pp. 4335-4341, XP032287463.

http://www.new-technologies.org/ECT/Other/brickrob.htm. "Emerging Construction Technologies." Dec. 1, 2006.

Huang, S. et al., "Applying High-Speed Vision Sensing to an Industrial Robot for High-Performance Position Regulation under Uncertainties," Sensors, 2016, 16, 1195, 15 pages.

International Search Report and Written Opinion for International Application No. PCT/AU2021/050732; Date of Mailing: Sep. 21, 2021; 10 pages.

International Preliminary Report on Patentability for International Application No. PCT/AU2017/050731; Date of Mailing: Jan. 15, 2019; 5 pages.

International Preliminary Report on Patentability for International Application No. PCT/AU2017/050738; Date of Mailing: Jan. 15, 2019; 13 pages.

International Preliminary Report on Patentability for International Application No. PCT/AU2017/050739; Date of Mailing: Jan. 15, 2019; 6 pages.

International Preliminary Report on Patentability for International Application No. PCT/AU2018/050733; Date of Mailing: Jan. 21, 2020; 6 pages.

International Preliminary Report on Patentability for International Application No. PCT/AU2018/050734; Date of Mailing: Jan. 21, 2020; 9 pages.

International Preliminary Report on Patentability for International Application No. PCT/AU2018/050737; Date of Mailing: Jan. 21, 2020; 6 pages.

(56) References Cited

OTHER PUBLICATIONS

International Preliminary Report on Patentability for International Application No. PCT/AU2018/050739; Date of Mailing: Jan. 21, 2020; 6 pages.
International Preliminary Report on Patentability for International Application No. PCT/AU2018/050740; Date of Mailing: Jan. 21, 2020; 6 pages.
International Search Report and Written Opinion for International Application No. PCT/AU2017/050730; Date of Mailing: Aug. 23, 2017; 17 pages.
International Search Report and Written Opinion for International Application No. PCT/AU2017/050731; Date of Mailing: Aug. 31, 2017; 8 pages.
International Search Report and Written Opinion for International Application No. PCT/AU2017/050738; Date of Mailing: Oct. 17, 2017; 19 pages.
International Search Report and Written Opinion for International Application No. PCT/AU2017/050739; Date of Mailing: Sep. 28, 2017; 9 pages.
International Search Report and Written Opinion for International Patent Application No. PCT/AU19/50742; Date of Mailing Sep. 23, 2019; 5 pages.
International Search Report and Written Opinion for International Patent Application No. PCT/AU19/50743; Date of Mailing mailed Oct. 1, 2019; 10 pages.
International Search Report and Written Opinion for International Patent Application No. PCT/AU20/50367; Date of Mailing Jun. 29, 2020; 15 pages.
International Search Report and Written Opinion for International Patent Application No. PCT/AU20/50368; Date of Mailing Jun. 25, 2020; 11 pages.
Kazemi, M. et al.: "Path Planning for Image-based Control of Wheeled Mobile Manipulators", 2012 IEEE /RSJ International Conference on Intelligent Robots and Systems, Oct. 7, 2012 (Oct. 7, 2012), Vilamoura, Portugal, XP055567470.
Kleinigger, M. et al: "Application of 6-DOF sensing for robotic disturbance compensation", Automation Science and Engineering (CASE), 2010 IEEE Conference on, IEEE, Piscataway, NJ, USA, Aug. 21, 2010 (Aug. 21, 2010, pp. 344-349, XP031762876, ISBN: 978-1-4244-5477-1, *abstract*, *sections 1 to 3*.
Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272.
Koren et al.: "End-effector guidance of robot arms", CIRP Annals-Manufacturing Technology, vol. 36, No. 1, 1987, pp. 289-292, XP055456270.
Kwon, S. et al.: "On the Coarse/Fine Dual-Stage Manipulators with Robust Perturbation Compensator," IEEE, May 21-26, 2001, pp. 121-126.
Kyle in CMSC: Charlotte-Concord, Jul. 21-25, 2008.
Latteur, et al., "Drone-Based Additive Manufacturing of Architectural Structures," IASS Symposium 2015, Amsterdam, The Netherlands; Aug. 17-20, 2015; 12 pages.
Lippiello, V. et al.: "Position-Based Visual Servoing in Industrial Multirobot Cells Using a Hybrid Camera Configuration", IEEE Transactions on Robotics, vol. 23, No. 1, Feb. 2007 (Feb. 1, 2007), XP011163518.
Liu, Z. et al.: "EtherCAT Based Robot Modular Joint Controller", Proceeding of the 2015 IEEE International Conference on Information and Automation, Aug. 2015 (Aug. 1, 2015), Lijiang, China, pp. 1708-1713, XP033222650.
Mercedes-Benz: "Mercedes-Benz "Chicken" Magic Body Control TV commercial", YouTube, Sep. 23, 2013, 1 page. Retrevied from the internet: <https://www.youtube.com/watch?v+nLwML2PagbY>.
Notice of Acceptance of Patent Application received for priority Australian Patent Application No. 2017294796, mailed May 15, 2019 (158 pages).
Office Action mailed Apr. 21, 2021 in Japanese Patent Application No. 2019-523148, 4 pages.

Office Action mailed Aug. 20, 2021 for Japanese Patent Application No. 2019-523147, 3 pages.
Office Action mailed Jul. 5, 2021 for Japanese Patent Application No. 2019-523145, 4 pages.
Office Action mailed May 24, 2021 for Chinese Patent Application No. 201880067520.0, 8 pages.
Office Action mailed Sep. 3, 2021 for Chinese Patent Application No. 201780056460.8, 9 pages.
Partial Supplementary European Search Report mailed Apr. 14, 2020 in European Patent Application No. 17826696.1, 10 pages.
Pless, R .: "Using Many Cameras as One", IEEE Computer Society Conference on Computer Vision and Pattern Recognition, Jun. 18, 2003 (Jun. 18, 2003), Madison , WI, USA, pp. 1-7, XP055564465.
Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649.
Pritschow, G. et al., "A Mobile Robot for On-Site Construction of Masonry," Inst. of Control Tech. for Machine Tools and Manuf. Units, pp. 1701-1707.
Pritschow, G. et al., "Application Specific Realisation of a Mobile Robot for On-Site Construction of Masonry," Automation and Robotics in Construction XI, 1994, pp. 95-102.
Pritschow, G. et al., "Configurable Control System of a Mobile Robot for On-Site Construction of Masonry," Inst. of Control Technology for Machine Tools and Manuf. Units, pp. 85-92.
Pritschow, G. et al., "Technological aspects in the development of a mobile bricklaying robot," Automation in Construction 5 (1996), pp. 3-13.
Riegl Laser Measurement Systems. "Long Range & High Accuracy 3D Terrestrial Laser Scanner System—LMS-Z420i." pp. 1-4.
Salcudean, S. et al., "On the Control of Redundant Coarse-Fine Manipulators," IEEE, pp. 1834-1840.
Sandy, T. et al.: "Autonomous Repositioning and Localization of an In Situ Fabricator", 2016 IEEE International Conference on Robotics and Automation (ICRA), May 16, 2016 (May 16, 2016), pp. 2852-2858, XP055567467.
Siciliano, B. et al., "Robotics—chapters 2-4" Robotics, Dec. 31, 2009 (Dec. 31, 2009), Springer London, London, pp. 39-189.
Skibniewski, M.J., "Current Status of Construction Automation and Robotics in the United States of America," The 9th International Symposium on Automation and Robotics in Construction, Jun. 3-5, 1992, 8 pages.
Trimble ATS. "Advanced Tracking Sensor (ATS) with target recognition capability for stakeless machine control survey applications." pp. 1-4.
Vincze, M. et al., "A Laser Tracking System to Measure Position and Orientation of Robot End Effectors Under Motion," The International Journal of Robotics Research, vol. 13, No. 4, Aug. 1994, pp. 305-314.
Warszawski, A. et al., "Implementation of Robotics in Building: Current Status and Future Prospects," Journal of Construction Engineering and Management, Jan.y/Feb. 1998, 124(1), pp. 31-41.
Willmann, J. et al.: "Robotic Timber Construction—Expanding Additive Fabrication to New Dimensions", Automation in Construction, vol. 61, 2016, pp. 16-23, XP029310896.
Xu, H. et al.: "Uncalibrated Visual Servoing of Mobile Manipulators with an Eye-to-hand Camera", Proceedings of the 2016 IEEE International Conference on Robotics and Biomimetics, Dec. 3, 2016 (Dec. 3, 2016), Qingdao, China, pp. 2145-2150, XP033071767.
Yu, S.N. et al., "Feasibility verification of brick-laying robot using manipulation trajectory and the laying pattern optimization," Dept. of Mech. Eng., Automation in Construction (2009), pp. 644-655.
Zaki, T., "Parametric modeling of Blackwall assemblies for automated generation of shop drawings and detailed estimates using BIM", Master's Thesis, May 23, 2016, pp. 1-151.
Examination report dated Sep. 13, 2022 on Chinese Patent Application No. 201880066756.2, 11 pages.
IPRP dated Jan. 10, 2023 on International Patent Application No. PCT/AU2021/050732, 5 pages.
Examination report dated Sep. 30, 2023 on Australian Patent Application No. AU2018348785.

(56) References Cited

OTHER PUBLICATIONS

Examination report dated Sep. 30, 2023 on UAE Patent Application No. P60005242020.
Examination report issued Mar. 31, 2023 on Saudi Arabian Patent Application No. 522440994.
Examination Report dated Jul. 4, 2024 on European Patent Application No. 21837579.8.
International Preliminary Report on Patentability received for counterpart International Application No. PCT/AU2023/050325, mailed Oct. 8, 2024, 6 pages.
International Preliminary Report on Patentability received for International Patent Application No. PCT/AU2021/050361, mailed Oct. 25, 2022.

\* cited by examiner

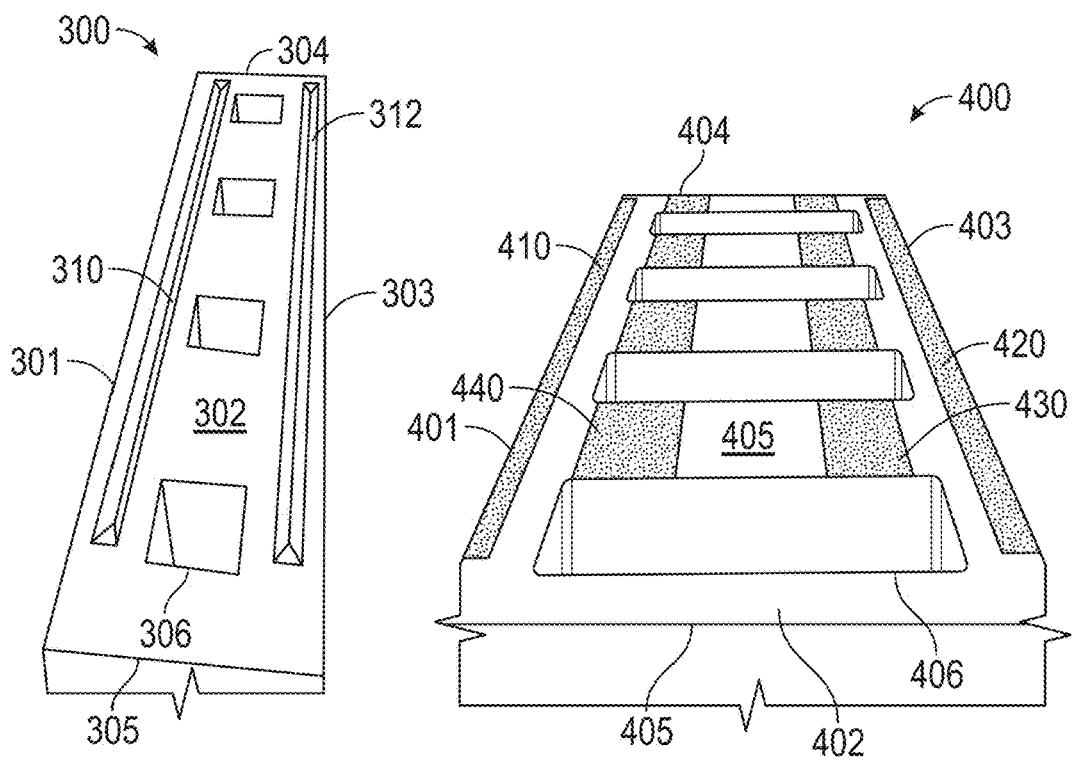
FIG. 12A
FIG. 12B
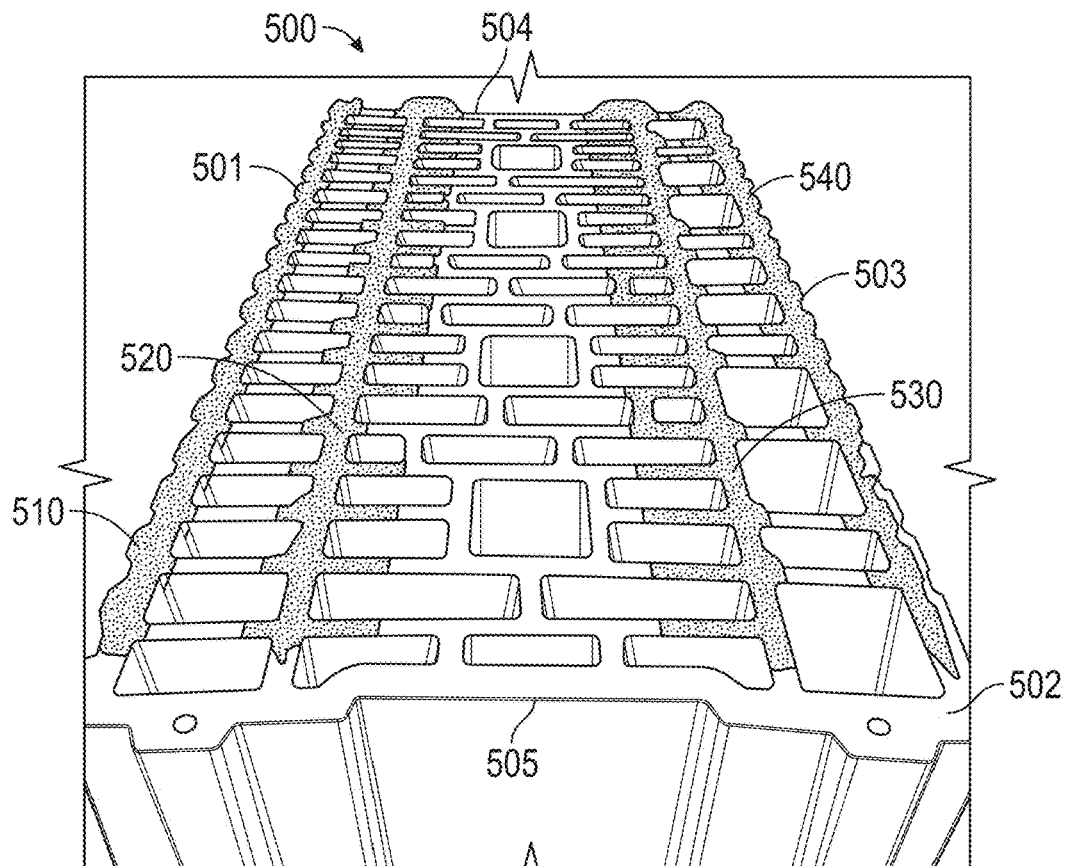
FIG. 12C

ADHESIVE APPLICATION SYSTEM

CROSS-REFERENCE TO RELATED APPLICATIONS

The present application is a United States national phase entry of International Application No. PCT/AU2021/050732, titled "ADHESIVE APPLICATION SYSTEM" and filed on Jul. 8, 2021 which claims priority from Australian Provisional Application No. 2020902367 titled "ADHESIVE APPLICATION SYSTEM" and filed on 8 Jul. 2020, the contents of which are hereby incorporated by reference in their entireties.

TECHNICAL FIELD

The present disclosure relates to an adhesive application system for an automated block laying machine. In a particular form, the system may be used to apply adhesive onto a brick or block, however the system may also be used to apply adhesive onto other construction materials such as roof tiles and the like.

BACKGROUND

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

WO 2007/076581 describes an automated brick laying system for constructing a building from a plurality of bricks comprising a robot provided with a brick laying and adhesive applying head, a measuring system, and a controller that provides control data to the robot to lay the bricks at predetermined locations. The measuring system measures in real time the position of the head and produces position data for the controller. The controller produces control data on the basis of a comparison between the position data and a predetermined or pre-programmed position of the head to lay a brick at a predetermined position for the building under construction. The controller can control the robot to construct the building in a course by course manner where the bricks are laid sequentially at their respective predetermined positions and where a complete course of bricks for the entire building is laid prior to laying of the bricks for the next course.

A number of adhesive application systems suitable for use with robotic construction equipment have been contemplated by the present applicant. For example in PCT/AU2019/000102, there is provided an adhesive application system for an automated brick laying machine, the adhesive application system comprising an adhesive reservoir, an adhesive supply line extending from the reservoir to one or more nozzles configured to dispense adhesive, a first pump (a primary pump) positioned near to the reservoir, at least one further pump (secondary pump) positioned near to the or each of the nozzles, a supply line load cell positioned near to the or each secondary pump, and a control system, wherein in use, the control system controls operation of the primary pump in response to a supply pressure sensed at the supply line load cell. An adhesive applicator assembly is provided comprising a base, at least one nozzle carriage assembly, each nozzle carriage assembly comprising a carriage, and at least one adhesive outlet nozzle depending from the carriage, for dispensing adhesive received from a supply of adhesive via an adhesive supply line, and a transverse drive means for driving the or each nozzle carriage assembly transversely relative to the base. The above described arrangement is a top-down pump system in which adhesive is pumped down onto an upward facing side of a brick so that gravity assists in applying adhesive to the brick.

The adhesive application system described in PCT/AU2019/000102 including the adhesive supply is co-located at the brick laying and adhesive applying head. This arrangement is in contrast to the system described in PCT/AU2017/050728, in which an adhesive container and pump was located proximate the chassis of a truck that provides the base of the automated brick laying machine and the adhesive was pumped out along the boom to an adhesive applicator mounted to the brick laying and adhesive applying head. The adhesive applicator in this system comprised an applicator head with nozzles supported on a distal end of a tongue member, said tongue member being housed in a sheath for linear movement to extend said adhesive applicator head across the surface of a brick for application of adhesive.

It is desirable to develop an adhesive application system for an automated block laying machine that provides an alternative to a top-down pumping system. In a top-down pumping system, dispensing adhesive in a metered dose can be difficult due to varying viscosity of the adhesive with temperature. As adhesive is applied to a top face of the block, it must be rotated before it is laid which can induce the adhesive to drip from the block. Furthermore, applying adhesive with nozzles can be difficult on blocks with complex grid/core structures. It would also be advantageous to reduce design complexity, part count and running costs whilst increasing adhesive application speed.

It is against this background and the problems and difficulties associated therewith that the present invention has been developed.

Other objects and advantages of the present invention will become apparent from the following description, taken in connection with the accompanying drawings, wherein, by way of illustration and example, at least one embodiment of the present invention is disclosed.

SUMMARY

In one broad form, an aspect of the present invention seeks to provide an adhesive application system for an automated block laying machine, the adhesive application system including:
  a) an adhesive supply; and,
  b) an adhesive applicator including:
    i) a container for storing an adhesive reservoir received from the adhesive supply via an adhesive supply line;
    ii) a lid mounted to the container so as to substantially cover the adhesive reservoir; and,
    iii) an adhesive roller rotatably coupled to the container and configured to be at least partially submerged in the adhesive reservoir so that upon rotation adhesive from the reservoir is entrained up and around at least a portion of the adhesive roller,
  wherein, in use, adhesive is transferred from the adhesive roller onto a bottom surface of a block as the block is moved across the roller.

In one embodiment, adhesive is provided to the adhesive applicator from the adhesive supply via a gravity feed.

In one embodiment, the adhesive supply is a canister having:
- a) an opening to allow the canister to be at least partially filled with adhesive; and,
- b) a removable cap that seals the opening and is configured to be in fluid communication with the adhesive supply line;
- wherein, in use, the canister is oriented so that the cap is facing downward and adhesive is able to flow by gravity through the cap and into the supply line.

In one embodiment, the adhesive supply line includes a valve which is openable to allow flow of adhesive into the container of the adhesive applicator.

In one embodiment, the valve is actuated by a motor and controllable to selectively open in order to meter the amount of adhesive supplied to the container.

In one embodiment, the motor is coupled to a reduction gearbox to increase torque for actuating the valve.

In one embodiment, the amount of adhesive in the container is monitored by at least one of:
- a) a level sensor that provides a signal to a controller indicative of the level of adhesive in the container; and,
- b) a mass sensor that provides a signal to a controller indicative of the mass of the container.

In one embodiment, the level sensor is a capacitive sensor mounted to the side of the container.

In one embodiment, the mass sensor is a load cell mounted beneath the container.

In one embodiment, the adhesive is heated prior to application.

In one embodiment, a heating element is provided at the base of the container.

In one embodiment, the adhesive roller includes:
- a) an elongate shaft having axles rotatably coupled to opposing ends of the container; and,
- b) one or more roller elements coupled to or integral with the shaft.

In one embodiment, in use, the one or more roller elements are at least partially submerged in the adhesive reservoir.

In one embodiment, the one or more roller elements at least partially protrude above the lid through openings therein.

In one embodiment, the one or more roller elements are circular discs or wheels.

In one embodiment, the one or more roller elements have at least one circumferential groove formed therein.

In one embodiment, the adhesive roller is driven by a motor coupled to the elongate shaft via a coupling element.

In one embodiment, a bead of adhesive is entrained onto the one or more roller elements as the shaft rotates and is transferred onto the block as the block moves across the adhesive roller, wherein one of:
- a) the block contacts the one or more roller elements; and,
- b) there is a gap between the block and the one or more roller elements less than or equal to the thickness of the bead of adhesive.

In one embodiment, the system is mounted to a block laying and adhesive applying head of the automated block laying machine, the head located at a distal end of a telescopingly extendable and foldable boom for conveying blocks therealong.

In one embodiment, the adhesive applicator is adjustably mounted to the head via a support post and bracket.

In another broad form, an aspect of the present invention seeks to provide a block laying and adhesive applying head for an automated block laying machine, the head mountable to a distal end of a telescopingly extendable and foldable boom for conveying blocks therealong, the head including an adhesive application system including:
- a) an adhesive supply; and,
- b) an adhesive applicator including:
  - i) a container for storing an adhesive reservoir received from the adhesive supply via an adhesive supply line;
  - ii) a lid mounted to the container so as to substantially cover the adhesive reservoir; and,
  - iii) an adhesive roller rotatably coupled to the container and configured to be at least partially submerged in the adhesive reservoir so that upon rotation adhesive from the reservoir is entrained up and around at least a portion of the adhesive roller,
- wherein, in use, adhesive is transferred from the adhesive roller onto a bottom surface of a block as the block is moved across the roller.

In one embodiment, the head includes a block transfer apparatus for transferring a block from a distal end of the boom to a robotic arm having an end effector which grips and lays the block at a predetermined spatial position and orientation, the block transfer apparatus configured to clamp the block and linearly extend it across the adhesive roller before it is transferred to the robotic arm and laid.

In another broad form, an aspect of the present invention seeks to provide a block laying and adhesive applying head for an automated block laying machine, the head mountable to a distal end of a telescopingly extendable and foldable boom for conveying blocks therealong, the head including:
- a) a support mountable to the boom;
- b) a robotic arm having an end effector operable to grip and lay blocks at a predetermined spatial position and orientation;
- c) a block transfer apparatus for transferring a block from the distal end of the boom to the robotic arm; and,
- d) an adhesive application system mounted to the support including:
  - i) an adhesive supply; and,
  - ii) an adhesive applicator including:
    - (1) a container for storing an adhesive reservoir received from the adhesive supply via an adhesive supply line;
    - (2) a lid mounted to the container so as to substantially cover the adhesive reservoir; and,
    - (3) an adhesive roller rotatably coupled to the container and configured to be at least partially submerged in the adhesive reservoir so that upon rotation adhesive from the reservoir is entrained up and around at least a portion of the adhesive roller,
- wherein, in use, adhesive is transferred from the adhesive roller onto a bottom surface of a block as the block transfer apparatus linearly extends a block across the roller.

In yet a further broad form, an aspect of the present invention seeks to provide an automated block laying machine, including:
- a) a base;
- b) a telescopingly extendable and foldable boom rotatably mounted from the base for conveying blocks therealong; and,
- c) a block laying and adhesive applying head, the head mountable to a distal end of the boom, the head including:

i) a support mountable to the boom;
ii) a robotic arm having an end effector operable to grip and lay blocks at a predetermined spatial position and orientation;
iii) a block transfer apparatus for transferring a block from the distal end of the boom to the robotic arm; and,
iv) an adhesive application system mounted to the support including:
   (1) an adhesive supply; and,
   (2) an adhesive applicator including:
      (a) a container for storing an adhesive reservoir received from the adhesive supply via an adhesive supply line;
      (b) a lid mounted to the container so as to substantially cover the adhesive reservoir; and,
      (c) an adhesive roller rotatably coupled to the container and configured to be at least partially submerged in the adhesive reservoir so that upon rotation adhesive from the reservoir is entrained up and around at least a portion of the adhesive roller,
wherein, in use, adhesive is transferred from the adhesive roller onto a bottom surface of a block as the block transfer apparatus linearly extends a block across the roller.

In another broad form, an aspect of the present invention seeks to provide an adhesive application system for use in an automated block laying machine, the adhesive application system including:
a) an adhesive supply; and,
b) an adhesive applicator including:
   i) a container for storing an adhesive reservoir received from the adhesive supply via an adhesive supply line;
   ii) a pair of sprung roller arms coupled to the container for supporting an adhesive roller; and,
   iii) an adhesive roller rotatably coupled to the sprung roller arms and configured to extend across the container, the adhesive roller at least partially submerged in the adhesive reservoir so that upon rotation adhesive from the reservoir is entrained up and around the roller;
wherein, in use, adhesive is transferred from the adhesive roller onto a bottom surface of a block as the block is moved across the roller.

In one embodiment, the pair of sprung roller arms form part of a lid that at least partly conceals the adhesive reservoir in the container.

In one embodiment, the pair of sprung roller arms are disposed about opposing sides of the container.

In one embodiment, the pair of sprung roller arms include a groove or slot into which an axle of the adhesive roller is rotatably coupled.

In one embodiment, the sprung roller arms are coupled to the container by an integral moulding that includes a built-in hinge or pivot that allows the arms to flex.

In one embodiment, the adhesive roller has an elongate body having a plurality of circumferential grooves spaced apart along the length of the body.

In one embodiment, the adhesive roller includes:
a) an elongate shaft; and,
b) a plurality of spaced apart roller elements coupled to the shaft.

In one embodiment, the roller elements are cylindrical and include a plurality of circumferential grooves.

In one embodiment, the roller elements are spaced apart by spacer elements.

In one embodiment, the adhesive roller includes alternating roller and spacer elements coupled to the shaft and wherein the spacer elements have a diameter less than the roller elements.

In one embodiment, the adhesive applicator further includes a scraper coupled to the pair of sprung roller arms proximate a distal end thereof, the scraper having an elongate body defining:
a) one or more ridged sections including a plurality of ridges operable to block particular grooves of the adhesive roller and scrape adhesive therefrom; and,
b) one or more voids positioned between the ridged sections, the voids providing areas where adhesive is able to be entrained onto the roller to thereby define a pre-defined adhesive signature.

In one embodiment, the scraper is removably mounted to the roller arms.

In one embodiment, the scraper is urged beneath tabs located along a lengthwise edge of the lid so as to pretension the pair of sprung roller arms.

In one embodiment, the container is mounted in a cradle.

In one embodiment, a heated plate is mounted to the base of the cradle and the container is mounted onto the heated plate so as to control the temperature of the adhesive in the reservoir.

In one embodiment, a load cell is positioned beneath the cradle and used to monitor the weight of the adhesive in the reservoir so as to maintain a programmed level of adhesive in the reservoir.

In one embodiment, the lid further includes a pivotable cover disposed between the pair of sprung roller arms and extending towards the adhesive roller, a distal end of the pivotable cover urged beneath tabs disposed on the sprung roller arms so as to allow any adhesive on the surface of the cover to drain back into the reservoir.

In one embodiment, adhesive from the adhesive supply is pumped into the container via a peristaltic pump.

In one embodiment, the pump is one of:
a) servo controlled; and,
b) a linear peristaltic pump comprised of multiple pinch valves.

In one embodiment, the system is mounted to a block laying and adhesive applying head of the automated block laying machine, the head located at a distal end of a telescopingly extendable and foldable boom for conveying blocks therealong.

In one embodiment, the adhesive applicator is adjustably mounted to the head via a support post and bracket.

In another broad form, an aspect of the present invention seeks to provide a block laying and adhesive applying head for an automated block laying machine, the head mountable to a distal end of a telescopingly extendable and foldable boom for conveying blocks therealong, the head including an adhesive application system including:
a) a container for storing an adhesive reservoir received from the adhesive supply via an adhesive supply line;
b) a pair of sprung roller arms coupled to the container for supporting an adhesive roller; and,
c) an adhesive roller rotatably coupled to the sprung roller arms and configured to extend across the container, the adhesive roller at least partially submerged in the adhesive reservoir so that upon rotation adhesive from the reservoir is entrained up and around the roller;

wherein, in use, adhesive is transferred from the adhesive roller onto a bottom surface of a block as the block is moved across the roller.

In one embodiment, the head includes a block transfer apparatus for transferring a block from a distal end of the boom to a robotic arm having an end effector which grips and lays the block at a predetermined spatial position and orientation, the block transfer apparatus configured to clamp the block and linearly extend it across the adhesive roller before it is transferred to the robotic arm and laid.

In another broad form, an aspect of the present invention seeks to provide a block laying and adhesive applying head for an automated block laying machine, the head mountable to a distal end of a telescopingly extendable and foldable boom for conveying blocks therealong, the head including:
  a) a support mountable to the boom;
  b) a robotic arm having an end effector operable to grip and lay blocks at a predetermined spatial position and orientation;
  c) a block transfer apparatus for transferring a block from the distal end of the boom to the robotic arm; and,
  d) an adhesive application system mounted to the support including:
    i) a container for storing an adhesive reservoir received from the adhesive supply via an adhesive supply line;
    ii) a pair of sprung roller arms coupled to the container for supporting an adhesive roller;
    iii) an adhesive roller rotatably coupled to the sprung roller arms and configured to extend across the container, the adhesive roller at least partially submerged in the adhesive reservoir so that upon rotation adhesive from the reservoir is entrained up and around the roller;
  wherein, in use, adhesive is transferred from the adhesive roller onto a bottom surface of a block as the block transfer apparatus linearly extends a block across the roller.

In another broad form, an aspect of the present invention seeks to provide an automated block laying machine, including:
  a) a base;
  b) a telescopingly extendable and foldable boom rotatably mounted from the base for conveying blocks therealong; and,
  c) a block laying and adhesive applying head, the head mountable to a distal end of the, the head including:
    i) a support mountable to the boom;
    ii) a robotic arm having an end effector operable to grip and lay blocks at a predetermined spatial position and orientation;
    iii) a block transfer apparatus for transferring a block from the distal end of the boom to the robotic arm; and,
    iv) an adhesive application system mounted to the support including:
      (1) an adhesive supply; and,
      (2) an adhesive applicator, including:
        (a) a container for storing an adhesive reservoir received from the adhesive supply via an adhesive supply line;
        (b) a pair of sprung roller arms coupled to the container for supporting an adhesive roller; and,
        (c) an adhesive roller rotatably coupled to the sprung roller arms and configured to extend across the container, the adhesive roller at least partially submerged in the adhesive reservoir so that upon rotation adhesive from the reservoir is entrained up and around the roller;
  wherein, in use, adhesive is transferred from the adhesive roller onto a bottom surface of a block as the block transfer apparatus linearly extends a block across the roller.

In another broad form, an aspect of the present invention seeks to provide an adhesive application system for an automated block laying machine, the adhesive application system including:
  a) an adhesive supply;
  b) an adhesive applicator including:
    i) a container for storing an adhesive reservoir received from the adhesive supply via an adhesive supply line;
    ii) a lid mounted to the container so as to substantially cover the adhesive reservoir; and,
    iii) an adhesive roller rotatably coupled to the lid so that upon rotation adhesive from the reservoir is entrained up and around the roller,
  wherein, in use, adhesive is transferred from the adhesive roller onto a bottom surface of a block as the block is moved across the roller.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:—

FIGS. 12A to 12C show photographs of example adhesive signatures applied to a variety of block geometries;

DETAILED DESCRIPTION

Figure 1A:
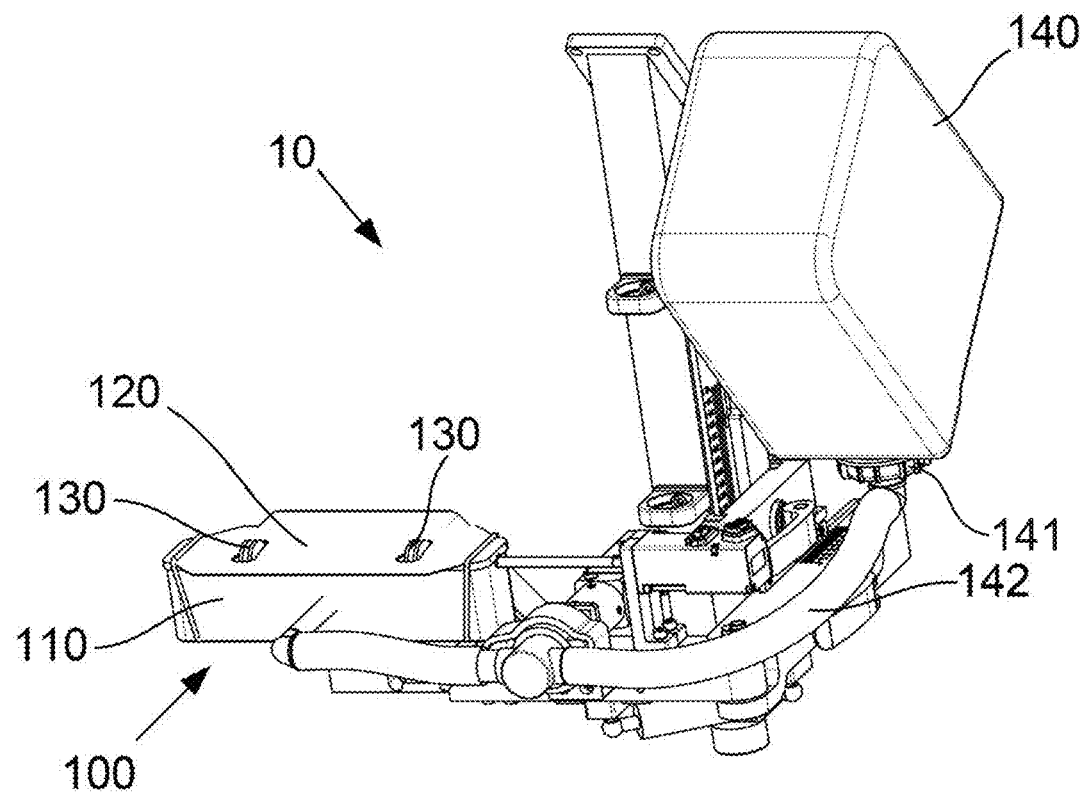
FIG. 1A is an upper perspective view of an example of an adhesive application system for an automated block laying machine.
Figure 1B:
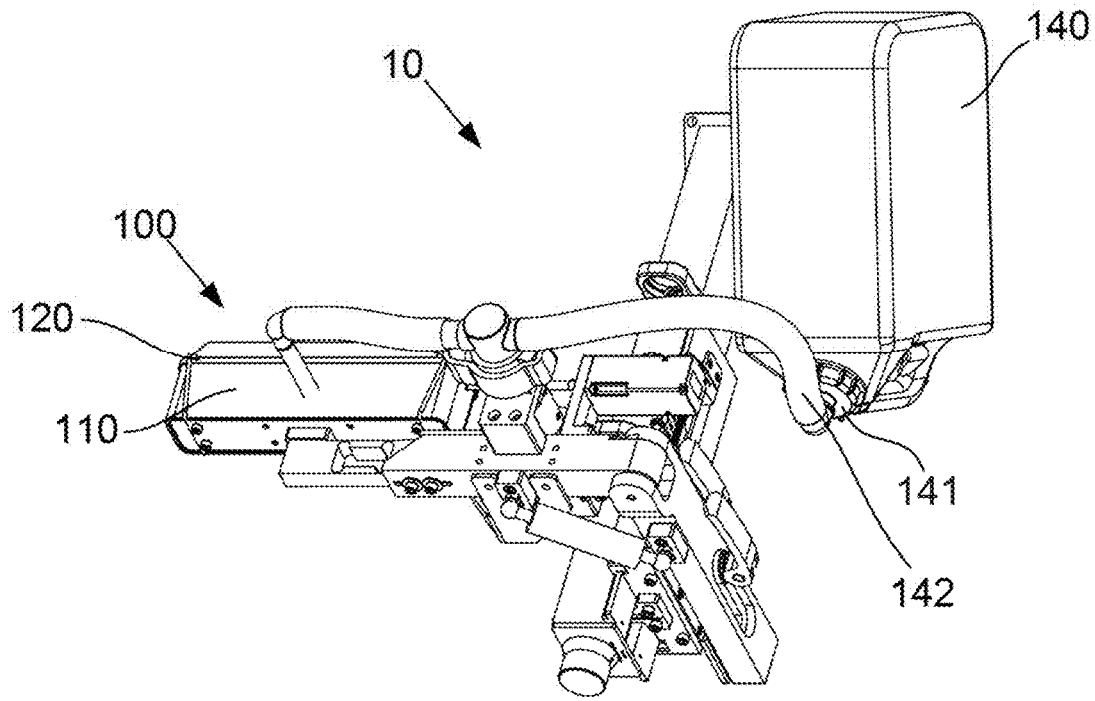
FIG. 1B is a lower perspective view of the adhesive application system of FIG. 1A.

An example of an adhesive application system 10 for an automated block laying machine will now be described with reference to FIG. 1A.

In this example, the system 10 includes an adhesive supply 140 and an adhesive applicator 100 including a container 110 for storing an adhesive reservoir received from the adhesive supply 140 via an adhesive supply line 142 and a lid 120 mounted to the container 110 so as to substantially cover the adhesive reservoir. The adhesive supply 140 includes an opening and a removable cap 141 configured to seal the opening and be in fluid communication with the adhesive supply line 142 such that adhesive within the adhesive supply 140 is able to flow by gravity through the cap 141 and into the supply line 142.

The adhesive applicator 100 further includes an adhesive roller 130 rotatably coupled to the container 110 and configured to be at least partially submerged in the adhesive reservoir so that upon rotation, adhesive from the reservoir is entrained up and around at least a portion of the adhesive roller 130. In use, adhesive is transferred from the adhesive roller onto a bottom surface of a block as the block is moved across the roller.

In accordance with the above-described arrangement, adhesive is applied to blocks in a bottom-up manner as opposed to a top-down pumping arrangement in which nozzles dispense adhesive onto the top surface of the block. In a top-down pumping arrangement, before a block can be laid, it must be flipped over so that the surface with adhesive is facing down. During this flipping motion, the adhesive is often prone to dripping which may lead to wastage, inadequate coverage on the block and contamination of the building site. The above-described adhesive application system 10 alleviates this problem and tends to minimise dripping as the block is not required to be rotated after adhesive application.

A roller-based adhesive application system eliminates many parts of a top-down pumping arrangement including pumps, nozzles, nozzle carriages, drives, gears etc. This reduces design complexity and cost. Furthermore, applying adhesive with a roller provides a more consistent and repeatable adhesive signature as less variables (such as line pressure, pump speed etc.) need to be controlled compared to a nozzle-based applicator. A pump-based system can have difficulties dispensing adhesive in a metered dose due to varying viscosity with temperature that can make pumping more difficult. The roller-based system overcomes this issue since adhesive is simply transferred from the roller onto the block as it moves across the roller.

In addition, a roller-based system allows adhesive to be applied easily onto blocks that may have a complex grid or core structure (such as Porotherm clay blocks) as the roller simply transfers adhesive onto adjacent web structures as the block is moved across the roller, whereas a nozzle application would lead to adhesive being dispensed into cores making it more difficult to achieve consistent coverage.

A number of further examples will now be described.

There are different ways in which adhesive may flow from the adhesive supply to the container of the adhesive applicator via the supply line in order to maintain a desired level in the container for continuous application. In one example, adhesive is provided to the adhesive applicator from the adhesive supply via a gravity feed.

In this example, the adhesive supply is a canister having an opening to allow the canister to be at least partially filled with adhesive; and, a removable cap that seals the opening and is configured to be in fluid communication with the adhesive supply line; wherein, in use, the canister is oriented so that the cap is facing downward and adhesive is able to flow by gravity through the cap and into the supply line. The term canister refers to any suitable type of container, drum or storage vessel that can store the construction adhesive.

Typically, it is made from an industrial strength, heavy duty, durable high density polyethylene (HDPE) or similar plastic.

The adhesive supply could take numerous forms including also an adhesive cartridge as described in co-pending application PCT/AU2019/000103 (hereby incorporated by reference) which comprises a bladder for the adhesive, a shell for the bladder, the shell comprising an aperture therethrough, and at least one valve assembly for controlling adhesive flow, the valve assembly comprising a valve body, at least a portion of which extends through the aperture and into the shell.

In an alternative arrangement such as one using the adhesive cartridge as described in co-pending application PCT/AU2019/000103, adhesive from the adhesive supply is pumped into the container via a peristaltic pump. The pump may be servo controlled. Alternatively, in a simpler arrangement a linear peristaltic pump may be used comprising multiple pinch valves which regulate the amount of adhesive pumped into the container.

In respect of the gravity feed system, typically the adhesive supply line includes a valve which is openable to allow flow of adhesive into the container of the adhesive applicator. The valve may be actuated by a motor and controllable to selectively open in order to meter the amount of adhesive supplied to the container in order to maintain a desired level.

Depending on the valve used and torque required to reliability open and close it, in some examples the motor is coupled to a reduction gearbox to increase torque for actuating the valve.

In order to prevent overfilling of the container and also to ensure a sufficient amount of adhesive is in the reservoir for application, the amount of adhesive in the container is constantly monitored. In one example, the amount of adhesive in the container is monitored by at least one of: a level sensor that provides a signal to a controller indicative of the level of adhesive in the container; and, a mass sensor that provides a signal to a controller indicative of the mass of the container.

The level sensor may be a capacitive sensor mounted to the side of the container whereas the mass sensor may be a load cell that is mounted beneath the container to measure the mass thereof.

In another example, a non-contact ultrasonic sensor to measure distance to the top of the adhesive in the container may be used.

In order to optimise adhesive application in all operating environments, it is preferable to heat the adhesive prior to application. This may be achieved by adding a heating element in the base of the container which assists in controlling the viscosity of the fluid.

The adhesive roller itself typically includes an elongate shaft having axles rotatably coupled to opposing ends of the container, and, one or more roller elements coupled to or integral with the shaft. In use, it is the one or more roller elements are at least partially submerged in the adhesive reservoir. The roller elements may be in the shape of circular discs or wheels and preferably with at least one circumferential groove formed therein which assists in entraining a bead of adhesive onto the or each roller element. The roller elements may vary in number and spacing to accommodate desired adhesive signature patterns for different block types and geometries.

In order to transfer adhesive onto the block, the one or more roller elements at least partially protrude above the lid through openings therein.

In one example, the adhesive roller is driven by a motor coupled to the elongate shaft via a coupling or transmission element. In its simplest form, the coupling element may just be a short length of polyvinyl chloride (PVC) tubing that sheaths over the end of the motor shaft at one end and over the shaft of the roller at the other. Driving the roller in this manner is advantageous as it provides a form of self-priming to the system ensuring that adhesive is always entrained onto the roller whenever a block moves across it. This ensures consistent application along the entire length of the block.

Typically, a bead of adhesive is entrained onto the one or more roller elements as the shaft rotates and is transferred onto the block as the block moves across the adhesive roller. Whilst in some implementations the block physically contacts the one or more roller elements as it moves across, this is not necessary and a gap between the block and the one or more roller elements may be provided that is less than or equal to the thickness of the bead of adhesive entrained on the roller elements.

In one example, the system is mounted to a block laying and adhesive applying head of the automated block laying machine, the head located at a distal end of a telescopingly extendable and foldable boom for conveying blocks therealong. The adhesive application may be adjustably mounted to the head via a support post and bracket to permit the applicator to be height adjusted to suit different block geometries and also in some embodiments adjusted laterally or longitudinally.

In another broad form, an aspect of the present invention seeks to provide a block laying and adhesive applying head for an automated block laying machine, the head mountable to a distal end of a telescopingly extendable and foldable boom for conveying blocks therealong, the head including an adhesive application system including: an adhesive supply; and, an adhesive applicator including: a container for storing an adhesive reservoir received from the adhesive supply via an adhesive supply line; a lid mounted to the container so as to substantially cover the adhesive reservoir; and, an adhesive roller rotatably coupled to the container and configured to be at least partially submerged in the adhesive reservoir so that upon rotation adhesive from the reservoir is entrained up and around at least a portion of the adhesive roller, wherein, in use, adhesive is transferred from the adhesive roller onto a bottom surface of a block as the block is moved across the roller.

In one example, the head includes a block transfer apparatus as described in applicant's co-pending application PCT/AU2021/050361 for transferring a block from a distal end of the boom to a robotic arm having an end effector which grips and lays the block at a predetermined spatial position and orientation, the block transfer apparatus configured to clamp the block and linearly extend it across the adhesive roller before it is transferred to the robotic arm and laid.

In another broad form, an aspect of the present invention seeks to provide a block laying and adhesive applying head for an automated block laying machine, the head mountable to a distal end of a telescopingly extendable and foldable boom for conveying blocks therealong, the head including: a support mountable to the boom; a robotic arm having an end effector operable to grip and lay blocks at a predetermined spatial position and orientation; a block transfer apparatus for transferring a block from the distal end of the boom to the robotic arm; and, an adhesive application system mounted to the support including: an adhesive supply; and, an adhesive applicator including: a container for storing an adhesive reservoir received from the adhesive supply via an adhesive supply line; a lid mounted to the container so as to substantially cover the adhesive reservoir;

and, an adhesive roller rotatably coupled to the container and configured to be at least partially submerged in the adhesive reservoir so that upon rotation adhesive from the reservoir is entrained up and around at least a portion of the adhesive roller, wherein, in use, adhesive is transferred from the adhesive roller onto a bottom surface of a block as the block transfer apparatus linearly extends a block across the roller.

In yet a further broad form, an aspect of the present invention seeks to provide an automated block laying machine, including: a base; a telescopingly extendable and foldable boom rotatably mounted from the base for conveying blocks therealong; and, a block laying and adhesive applying head, the head mountable to a distal end of the boom, the head including: a support mountable to the boom; a robotic arm having an end effector operable to grip and lay blocks at a predetermined spatial position and orientation; a block transfer apparatus for transferring a block from the distal end of the boom to the robotic arm; and, an adhesive application system mounted to the support including: an adhesive supply; and, an adhesive applicator including: a container for storing an adhesive reservoir received from the adhesive supply via an adhesive supply line; a lid mounted to the container so as to substantially cover the adhesive reservoir; and, an adhesive roller rotatably coupled to the container and configured to be at least partially submerged in the adhesive reservoir so that upon rotation adhesive from the reservoir is entrained up and around at least a portion of the adhesive roller, wherein, in use, adhesive is transferred from the adhesive roller onto a bottom surface of a block as the block transfer apparatus linearly extends a block across the roller.

The adhesive application system 10 shall now be described in further detail.

Figure 4A:
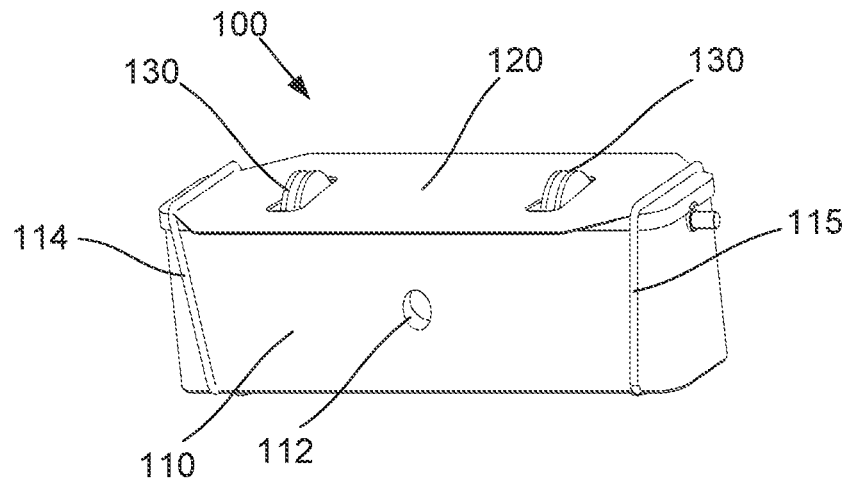
FIG. 4A is a perspective view of an example of an adhesive applicator of the adhesive application system of FIG. 1A.
Figure 4B:
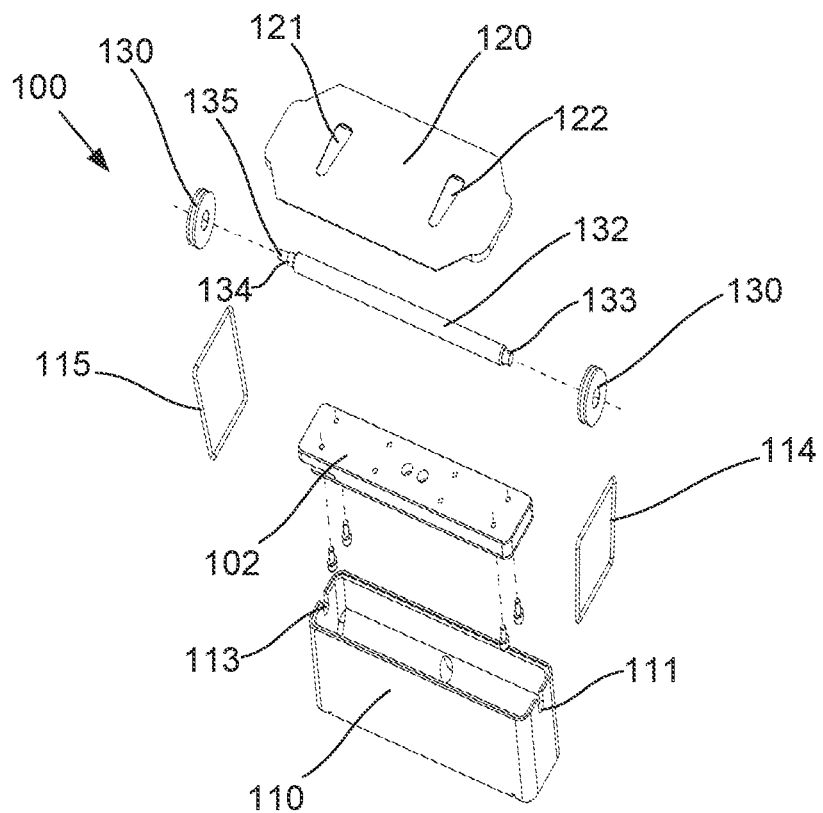
FIG. 4B is an exploded view of the adhesive applicator of FIG. 4A.

As shown in FIGS. 4A to 4B, the adhesive applicator 100 comprises a rectangular container 110 with an aperture 112 in a side thereof which provides an inlet for a fitting of the adhesive supply line 142 in order for adhesive to be metered into the container 110. The container 110 has slots 111, 113 in the ends thereof which receive ends 133, 134 of the elongate shaft 132 of the adhesive roller. In this example a pair of roller elements 130 in the form of circular discs with a slotted circumference are coupled to the shaft 132.

Figure 2A:
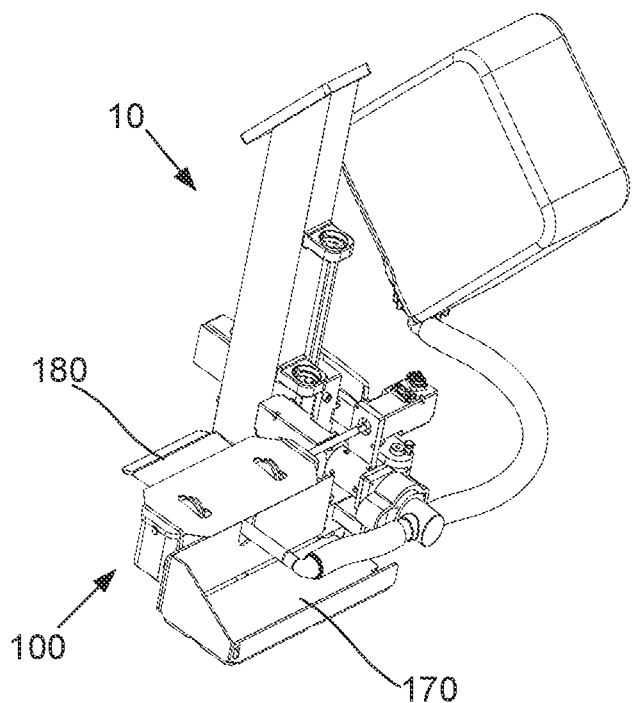
FIG. 2A is an upper perspective view of the adhesive application system of FIG. 1A showing a disposable trip tray and bump plate incorporated into the system.
Figure 2B:
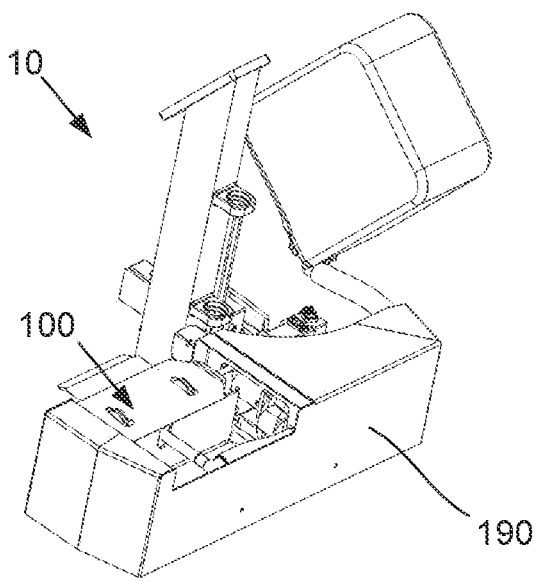
FIG. 2B is an upper perspective view of the adhesive application system of FIG. 2A showing an outer enclosure fitted to the system.

A lid 120 presses onto the top of the container 110, the lid 120 having a pair of spaced apart slots 121, 122 through which the adhesive rollers 130 protrude in operation. A pair of elastic bands or straps 114, 115 may assist in securing the lid 120 to the container 110 as shown. The lid may have flared sides which overhang the container to assist in directing any adhesive spill into catchment areas. For example, as shown in FIG. 2A, a disposable drip tray 170 may be located in front of the adhesive applicator to catch any overfill and drips from the bottom of a block as it is being moved across the applicator.

The container 110 is mounted onto a heating plate 102 which is screwed underneath the container for controlling the temperature (and viscosity) of the adhesive in the container before it is applied.

Figure 1C:
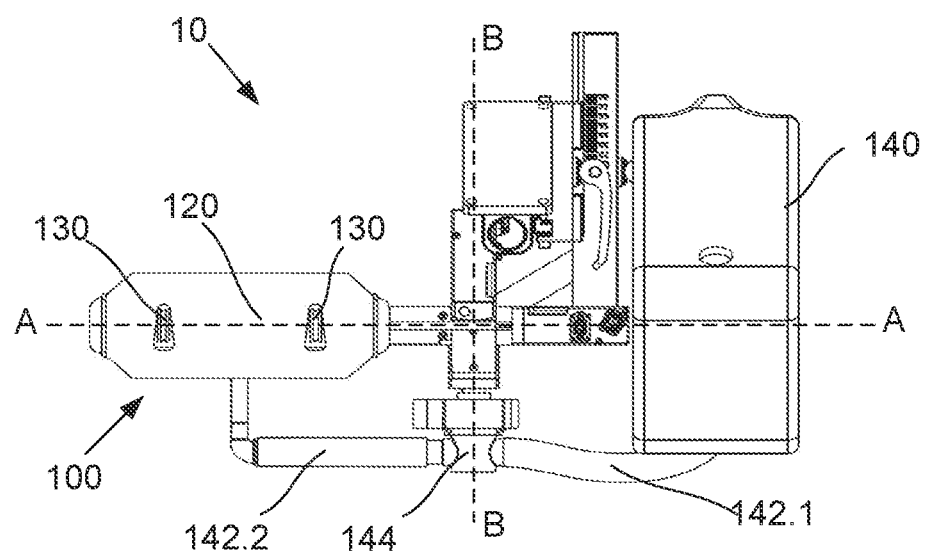
FIG. 1C is a top view of the adhesive application system of FIG. 1A.
Figure 1D:
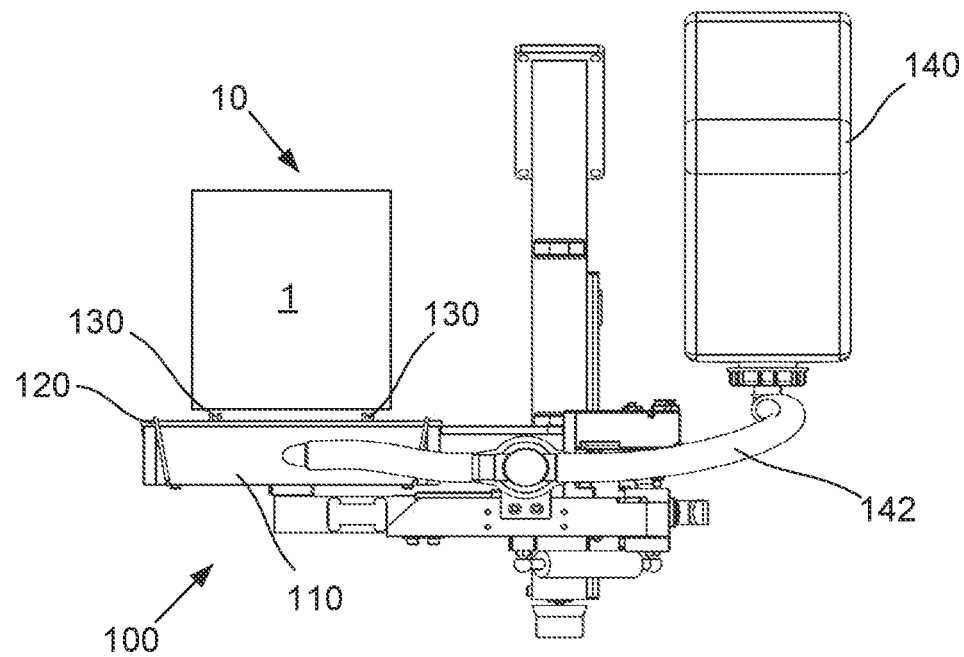
FIG. 1D is a front view of the adhesive application system of FIG. 1A showing a block disposed above the applicator.
Figure 1E:
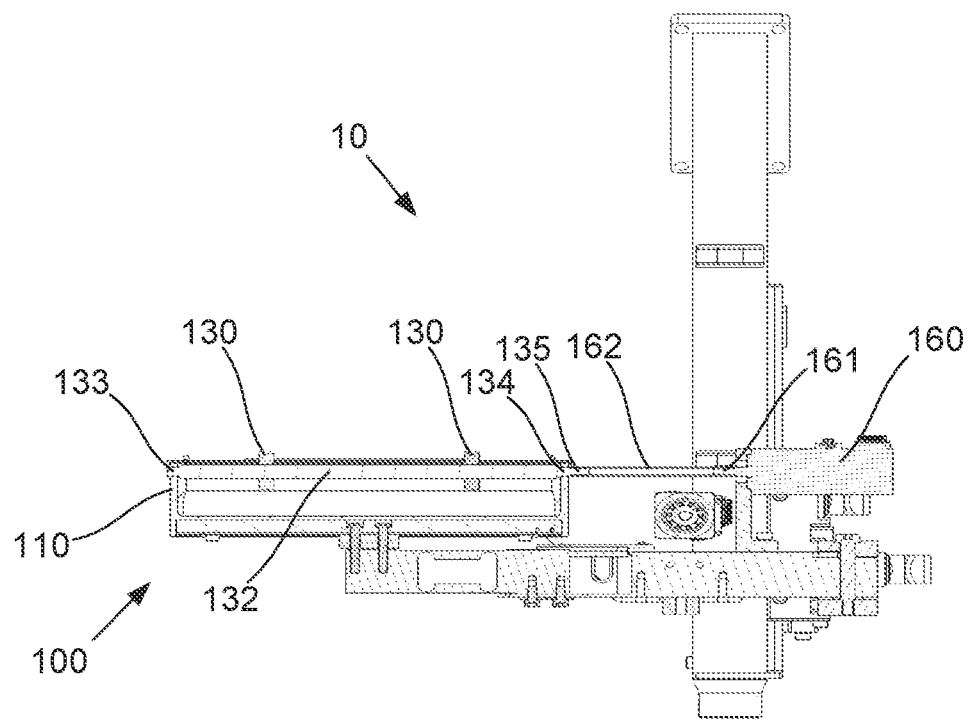
FIG. 1E is a cross-sectional view taken through section A-A of FIG. 1C showing the adhesive roller drive system.
Figure 1F:
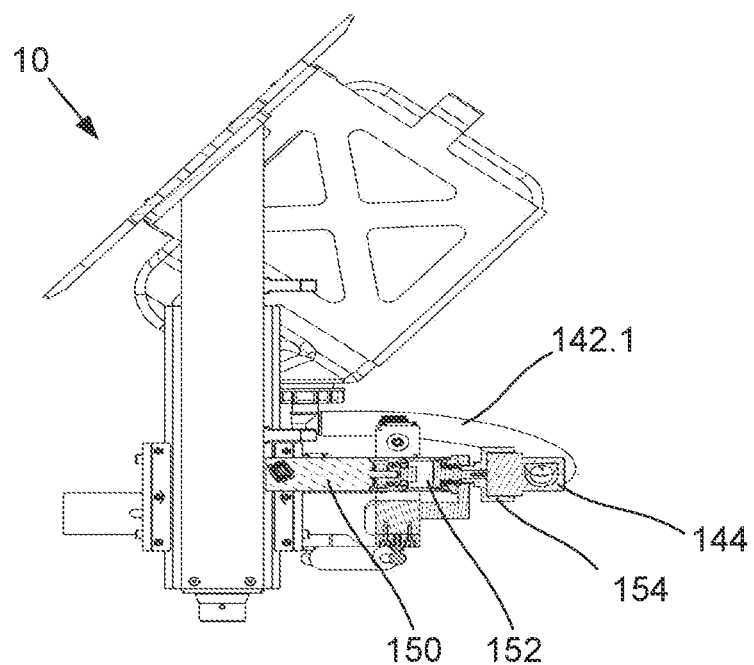
FIG. 1F is a cross-sectional view taken through section B-B of FIG. 1C showing the adhesive supply line valve actuation system.

Referring now to FIGS. 1C, 1E and 1F, further detail of actuation of the adhesive roller 130 and supply line valve 144 shall be described. In FIG. 1E, there is shown a sectional view through the adhesive roller shaft 132. Servo motor 160 drives this shaft 132 via a coupling element 162 which connects the motor shaft 161 and axle 135 of the roller shaft 132. In this way, the roller 130 can be primed and always ready to transfer a reliable bead of adhesive onto a block. The rotational speed of the roller 130 can be varied in accordance with a datafile which defines this parameter in order to ensure a reliable and repeatable application.

Figure 16:
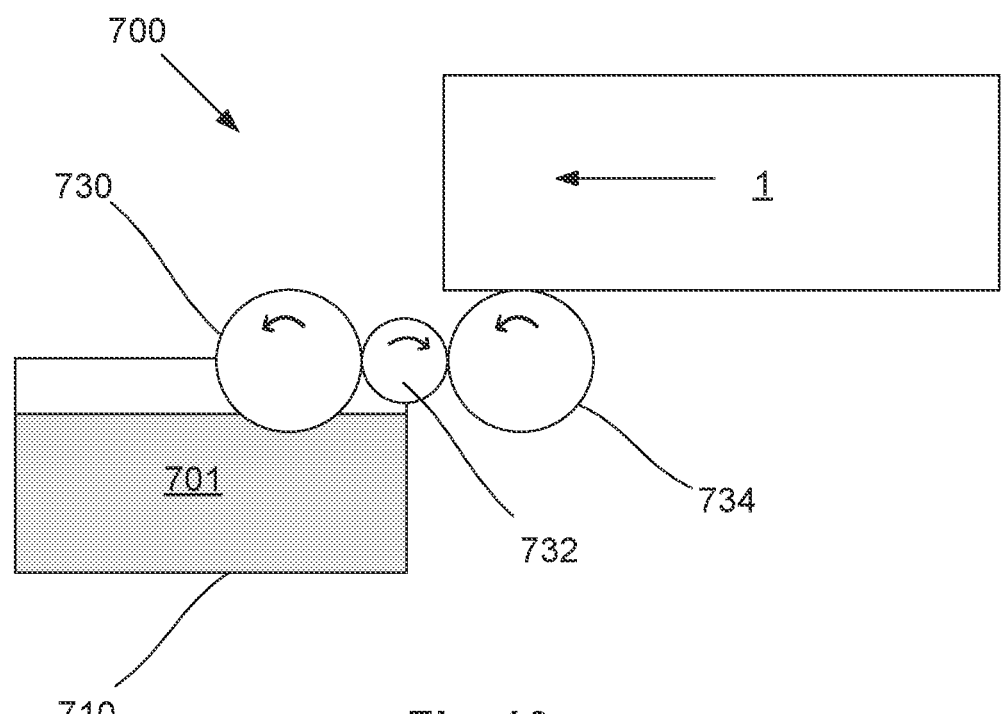
FIG. 16 is a schematic side view of an adhesive applicator having a self-priming system.

In an alternative example such as shown in FIG. 16, a system 700 may be configured so that the block 1 may move across a roller or gear 734 which turns connecting gear 732 and then primes the adhesive roller 730 so that when the block 1 passes over the applicator, a bead of adhesive is already entrained onto the roller 730. In this example, the block itself primes the system and no motor is necessary (i.e. the adhesive roller does not need to be motor driven).

Adhesive supply line valve 144 connects a first supply line segment 142.1 (between the supply 140 and valve 144) with a second supply line segment 142.2 (between the valve 144 and container 110). Adhesive from the supply 140 flows into first supply line segment 142.1 by gravity and is then metered into the second supply line segment 142.2 which flows into container 110 when the valve 144 is open. The valve 144 is pressed into a fitting 154 which has a complementary shape to the exterior of the valve body. The fitting 154 is actuated by a servo motor 150 via a reduction gearbox 152 which increases the torque output of the motor 150 so as to be able to rotate the fitting 154 and thereby open and close the valve 144.

In operation, a capacitive sensor mounted to the container 110 senses a level of adhesive therein and the valve 144 is then controlled in order to meter the appropriate amount of adhesive into the container 110.

Additional features which the adhesive application system 10 may have include a metal bump plate 180 installed to the rear of the adhesive applicator 100 slightly lower than the rollers 130 so that if the block is transferred lower than expected, it will contact the bump plate 180 instead of crashing into the applicator and causing damage to the system. The system may further include an outer enclosure 190 which provides a cover for part of the system and provides further protection to components especially to prevent any unwanted adhesive spill onto other parts of the system.

Figure 3A:
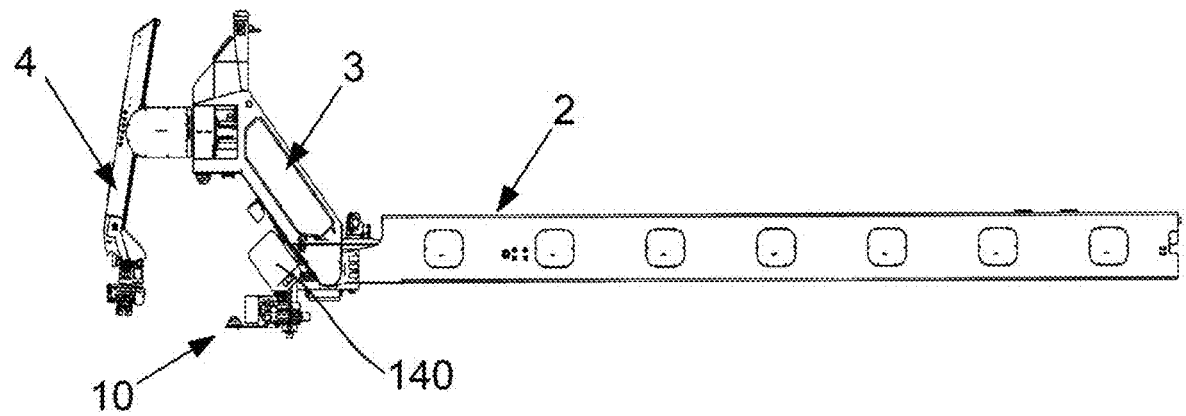
FIGS. 3A and 3B provide respective side and perspective views of a block laying and adhesive applying head and part of a boom assembly of an automated block laying machine including the adhesive application system of FIG. 1A.
Figure 3B:
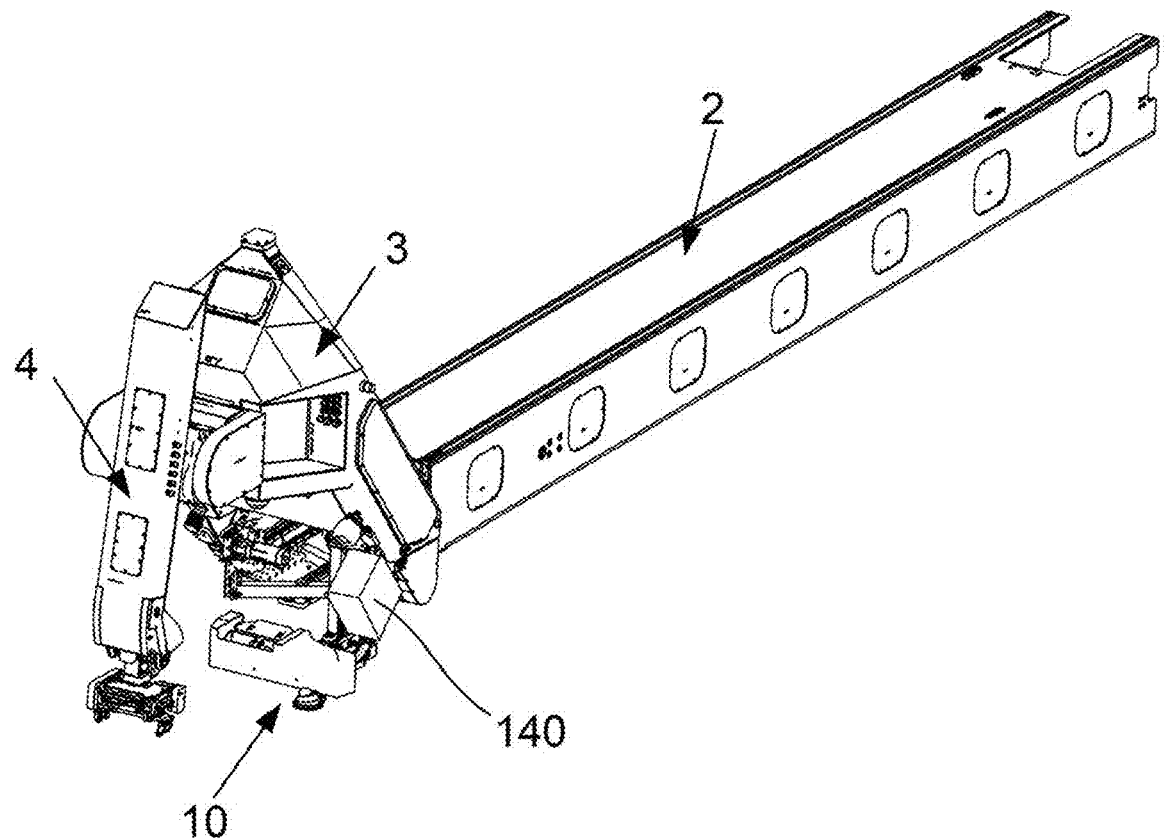

The adhesive application system 10 is installed onto a block laying and adhesive applying head 3 of an automated block laying robot as depicted in FIGS. 3A and 3B. The head 3 is mountable to a distal end of a telescopingly extendable and foldable boom 2 for conveying blocks therealong. A block transfer apparatus clamps a block received from a shuttle in the boom and extends the block across the adhesive applicator and then a laying arm picks up the block and places it at a desired position. The adhesive supply 140 is removably mounted to the side of the head 3 and the adhesive applicator assembly is mounted from the head by a support post.

Figure 5A:
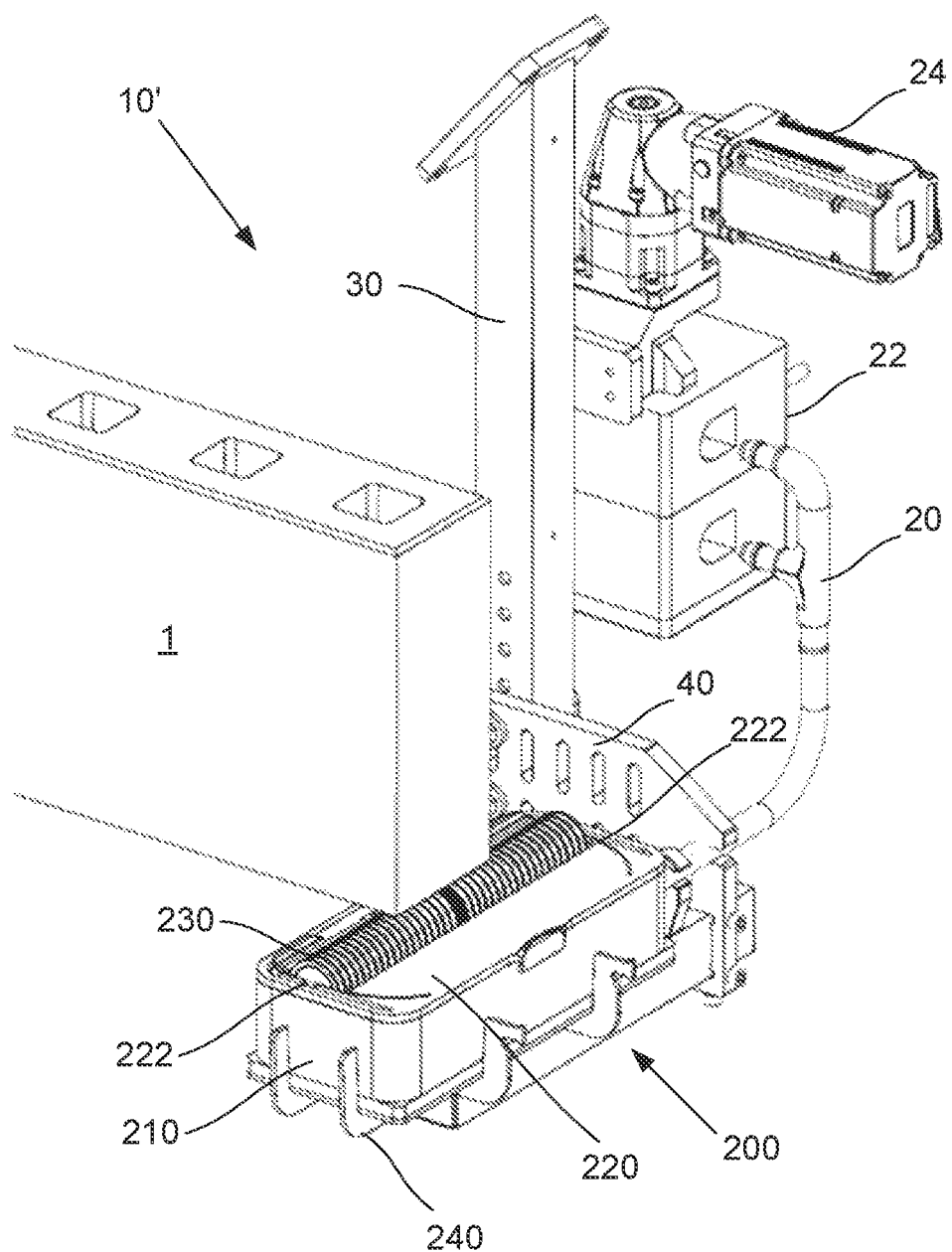
FIG. 5A is a perspective view of an example of an adhesive application system for an automated block laying machine.
Figure 5B:
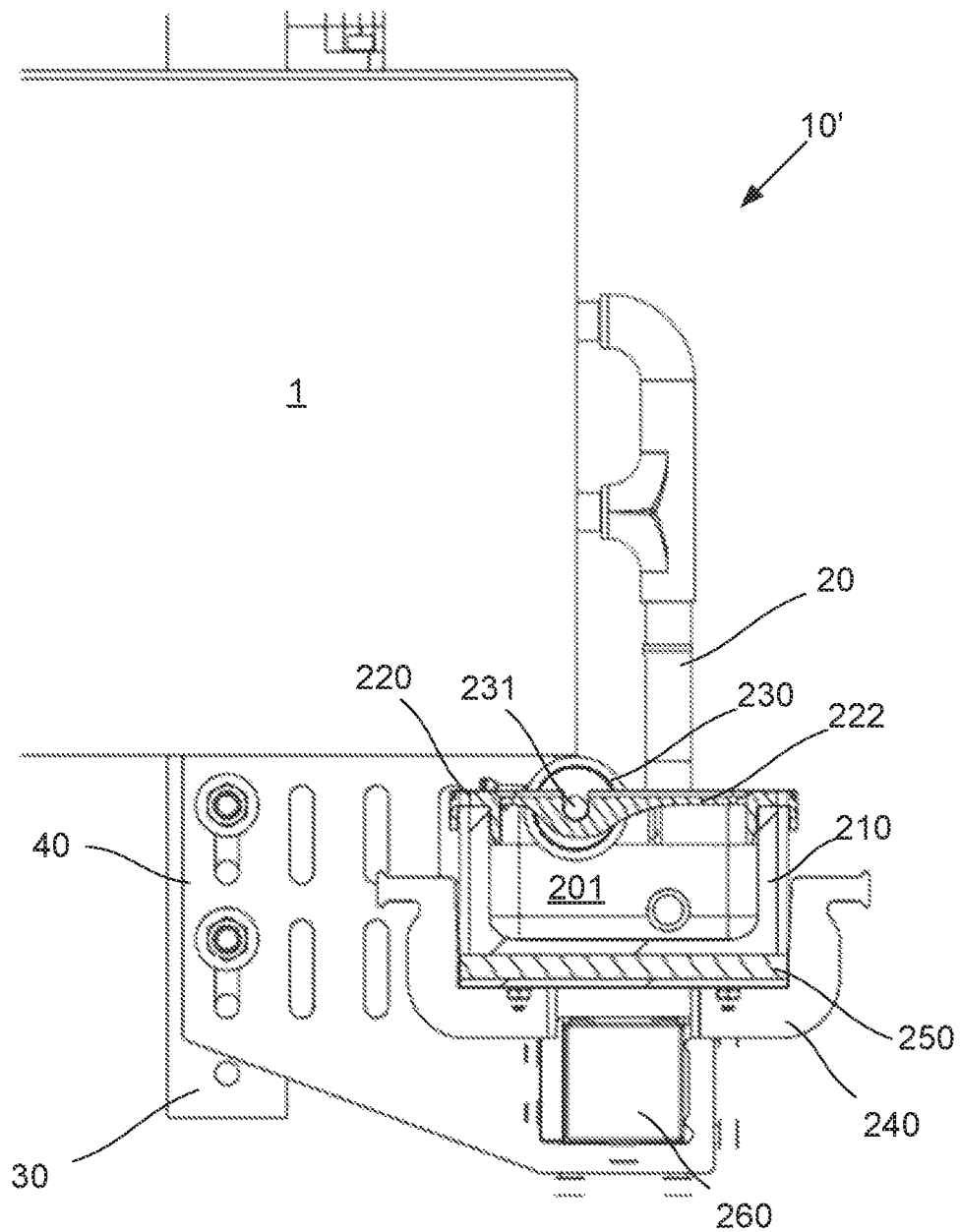
FIG. 5B is a cross-sectional view of the adhesive application system of FIG. 5A taken through a sprung roller arm of the adhesive applicator.

Another example of an adhesive application system 10' is shown in FIGS. 5A and 5B.

In this example, the system 10' includes an adhesive supply (not shown) and an adhesive applicator 200 including a container 210 for storing an adhesive reservoir 201 received from the adhesive supply via an adhesive supply line 20, a pair of sprung roller arms 222 coupled to the container 210 for supporting an adhesive roller 230. The adhesive roller 230 is rotatably coupled to the sprung roller arms 222 and is configured to extend across the container 210. The adhesive roller 230 is at least partially submerged in the adhesive reservoir 201 so that upon rotation, adhesive from the reservoir 201 is entrained up and around the roller 230. In use, adhesive is transferred from the adhesive roller 230 onto a bottom surface of a block 1 as the block 1 is moved across the roller 230.

The adhesive supply could take numerous forms as previously described such as the adhesive cartridge described in co-pending application PCT/AU2019/000103. Typically, adhesive from the adhesive supply is pumped into the container 210 via a peristaltic pump 22 and supply line 20. The pump 22 may be actuated by a servo motor 24 as shown in FIG. 5A. Alternatively, in a simpler arrangement a linear peristaltic pump may be used comprising multiple pinch valves which regulate the amount of adhesive pumped into the container.

The term "sprung roller arms" shall be understood to refer to flexible or compliant arms which support the adhesive roller and which are adapted to bend or flex under load about a pivot or hinge so as to induce positive contact between the roller and block in use. The arms could be plastic or metal leaf spring arms that are integrally moulded or formed with a lid or container cover, or alternatively formed part of components which engage onto the container but may not necessarily cover the container. The arms may be separate components, an integral component or otherwise connected together.

In this example, the pair of sprung roller arms 222 form part of a lid or cover 220 that at least partly conceals the adhesive reservoir 201 in the container 210. In this regard, it is generally desirable to cover the adhesive so as to prevent it from curing when exposed to air or humidity. In this arrangement, the sprung roller arms 222 may be integrally moulded or formed with the lid or otherwise attached to the lid structure.

Figure 9A:
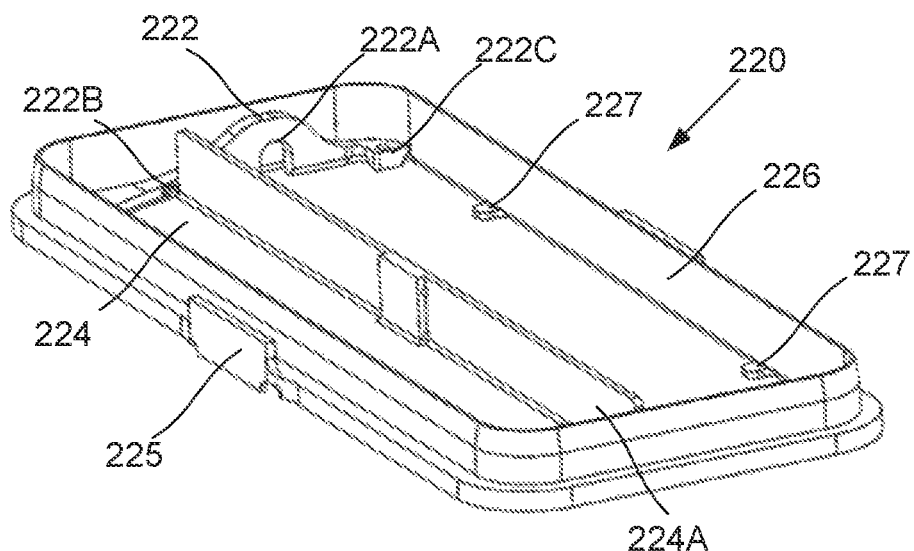
FIG. 9A is a lower perspective view of a lid of the adhesive applicator.
Figure 9B:
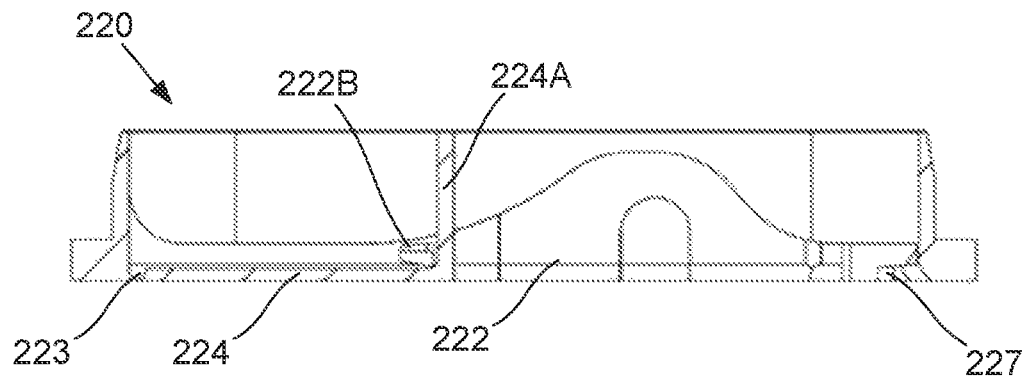
FIG. 9B is a cross-sectional view of the lid of FIG. 9A.

The pair of sprung roller arms 222 are disposed about opposing sides of the container 210. In this manner, the adhesive roller 230 is typically supported proximate opposing ends which allows the roller 230 to rotate. As shown in FIGS. 5B and 9A, the pair of sprung roller arms 222 include a groove or slot 222A into which an axle 231 of the adhesive roller 230 is rotatably coupled.

The components of the adhesive applicator 200 could be made from plastic or metal and in some examples, the container, lid, roller and sprung roller arms may be 3D printed and disposable after use. In one example, the container, lid and/or sprung roller arms are 3D printed plastic components whilst the adhesive roller is metal (i.e. steel).

The adhesive applicator 200 may be adjustably mounted to a support post 30 and bracket or plate assembly 40 which has a series of slots which enables the bracket (and adhesive applicator) to be moved up and down and back and forth as desired. This could be a manual adjustment or via suitable actuators which may be controlled to adjust the relative positioning of the applicator. The adhesive applicator 200 may be mounted onto a tubular support or bar 260 which extends laterally away from bracket 40.

In this regard, the container 210 is typically mounted in a cradle 240 and removably secured thereto. The cradle 240 is mounted to the tube or bar 260. In one example, a heated plate 250 is mounted to the base of the cradle 240 and the container 210 is mounted onto the heated plate 250 so as to control the temperature (and viscosity) of the adhesive in the reservoir 201.

Figure 10A:
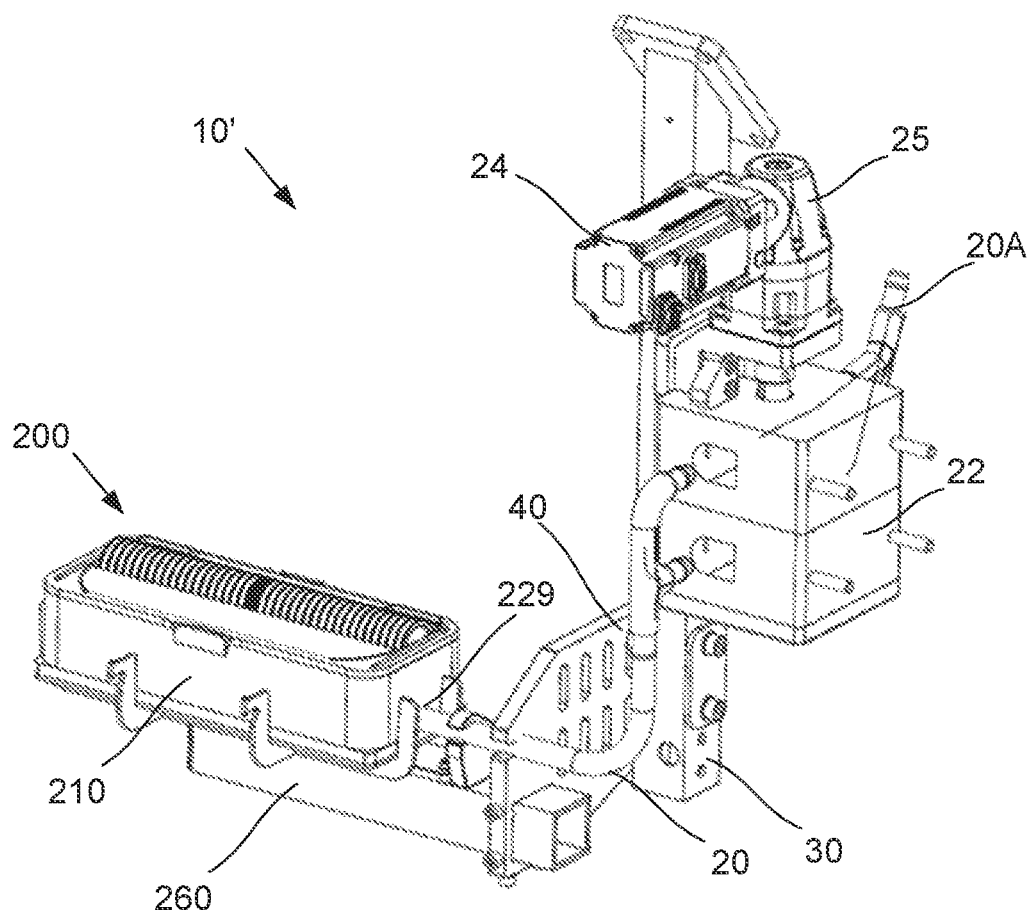
FIG. 10A is a further perspective view of the adhesive application system of FIG. 5A.
Figure 10B:
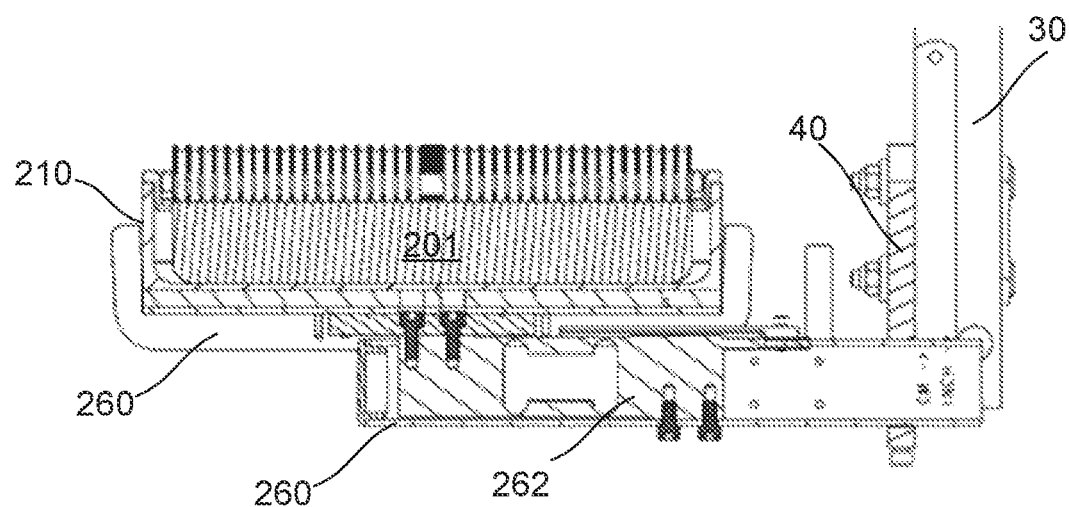
FIG. 10B is a cross-sectional view of the adhesive application system taken through the load cell beneath the adhesive applicator.
Figure 11A:
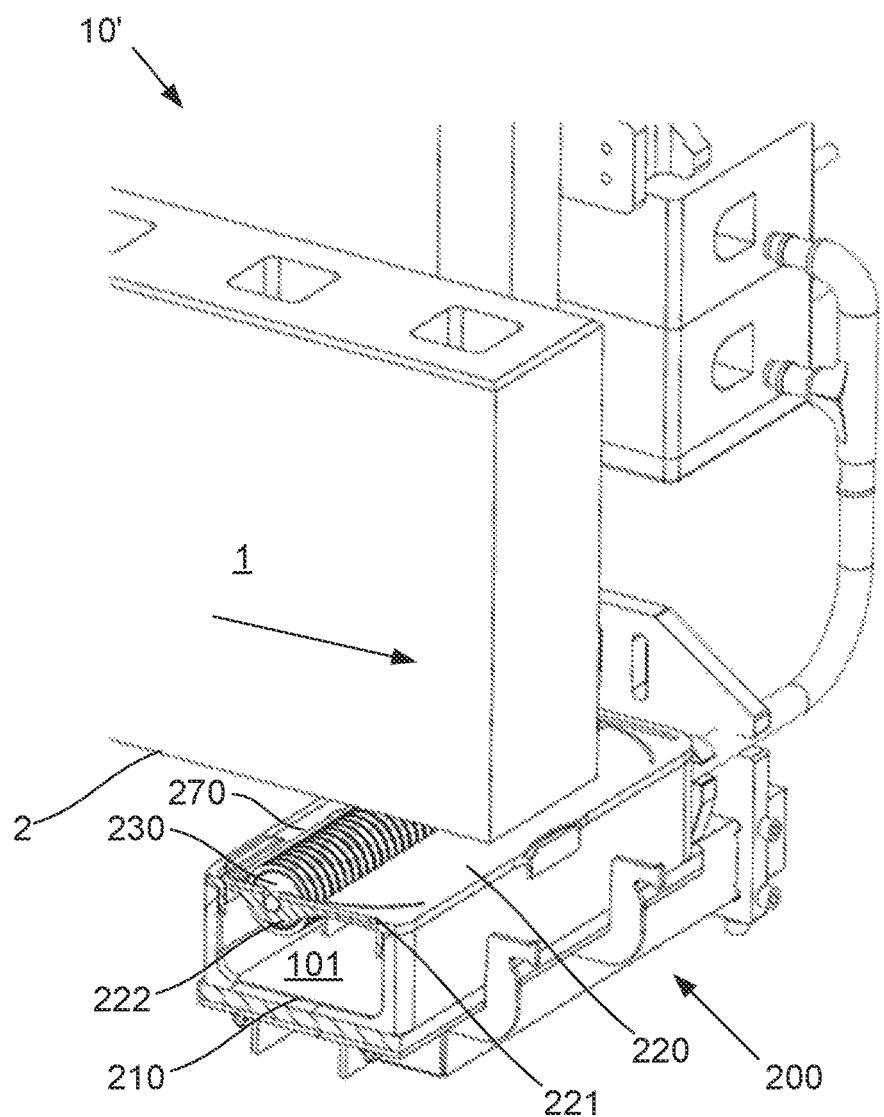
FIGS. 11A to 11H provide a sequence of views illustrating a block moving across the roller to thereby apply adhesive to the bottom surface of the block.
Figure 11B:
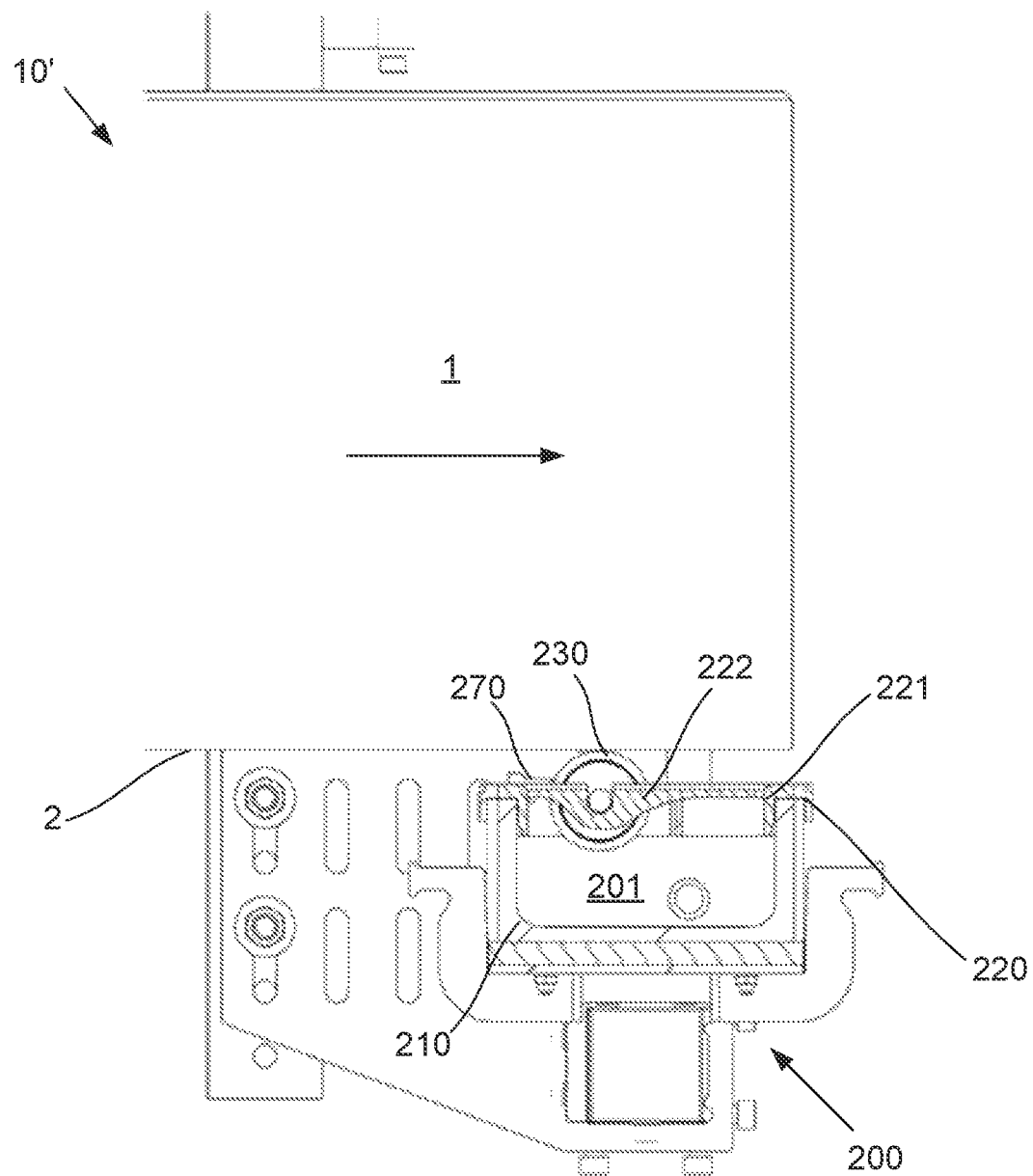
Figure 11C:
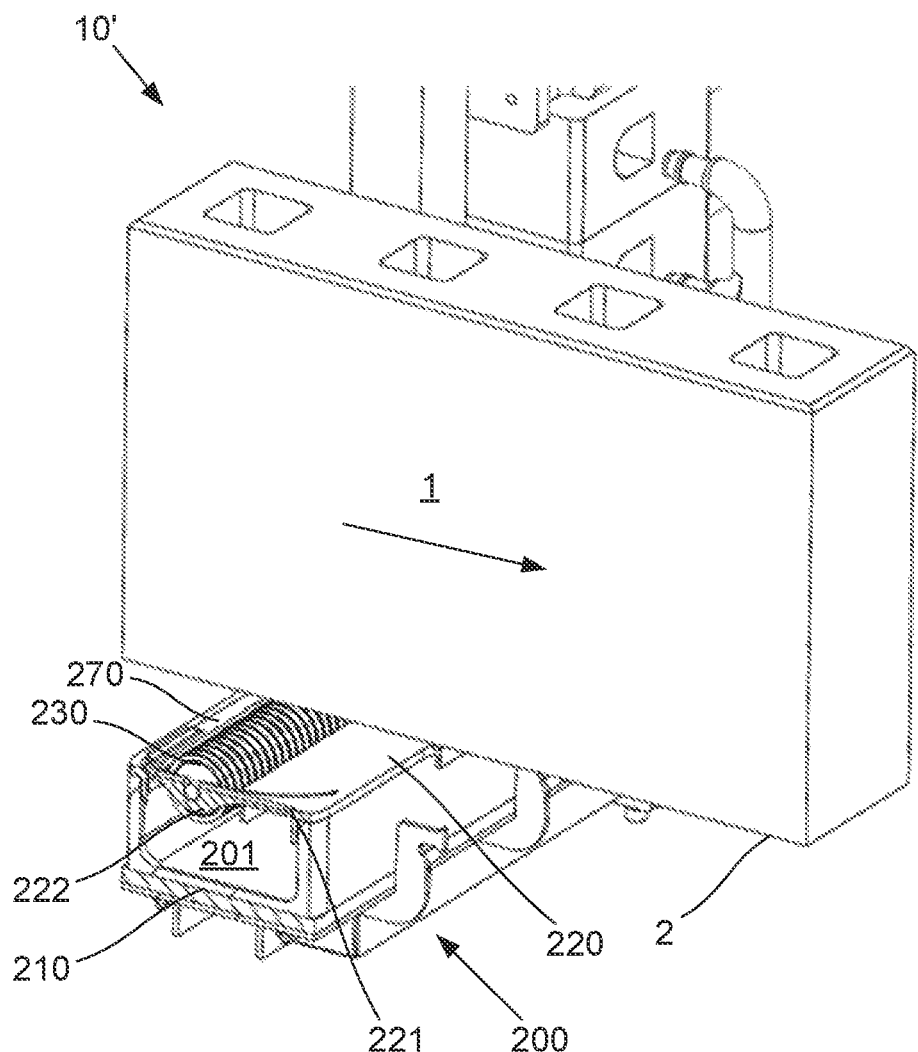
Figure 11D:
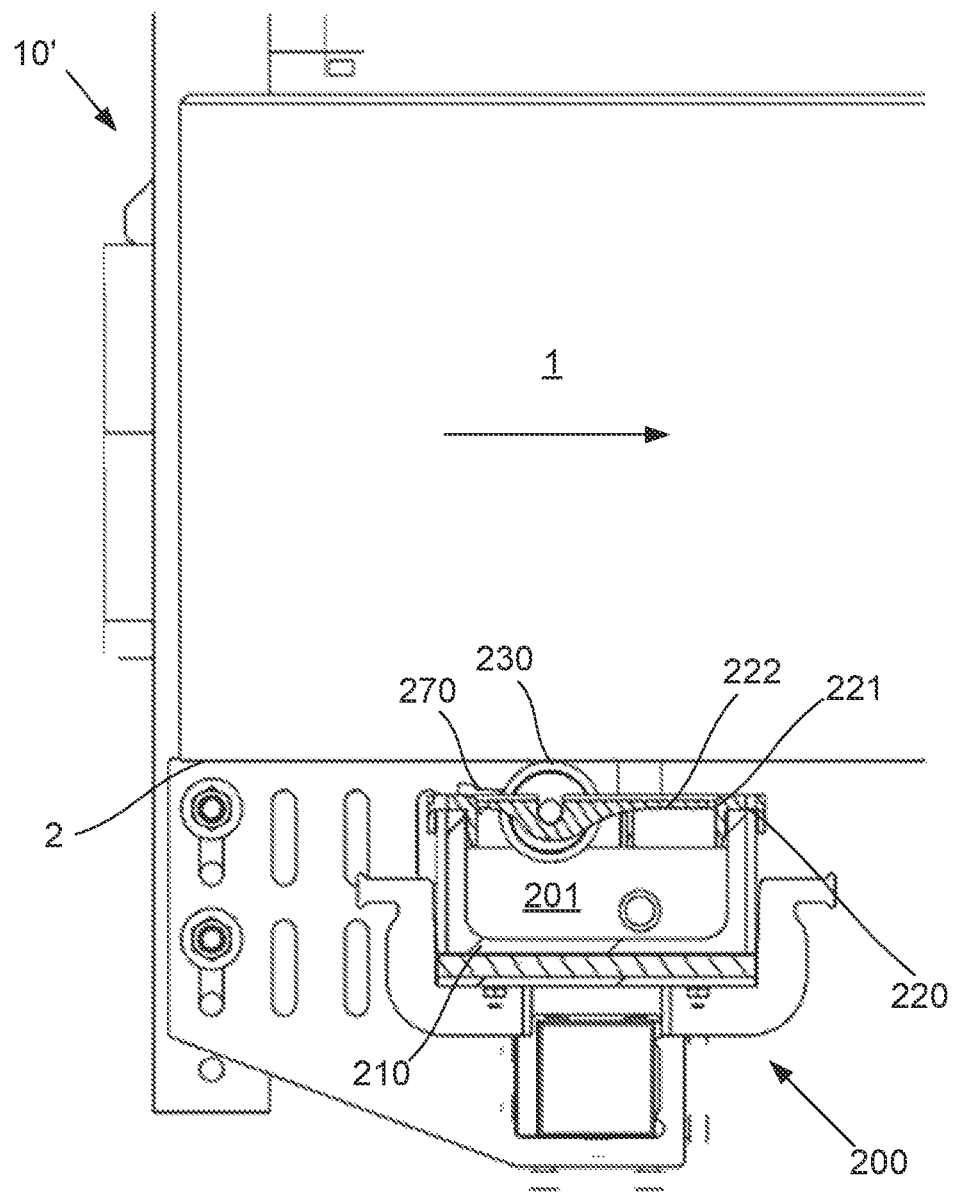
Figure 11E:
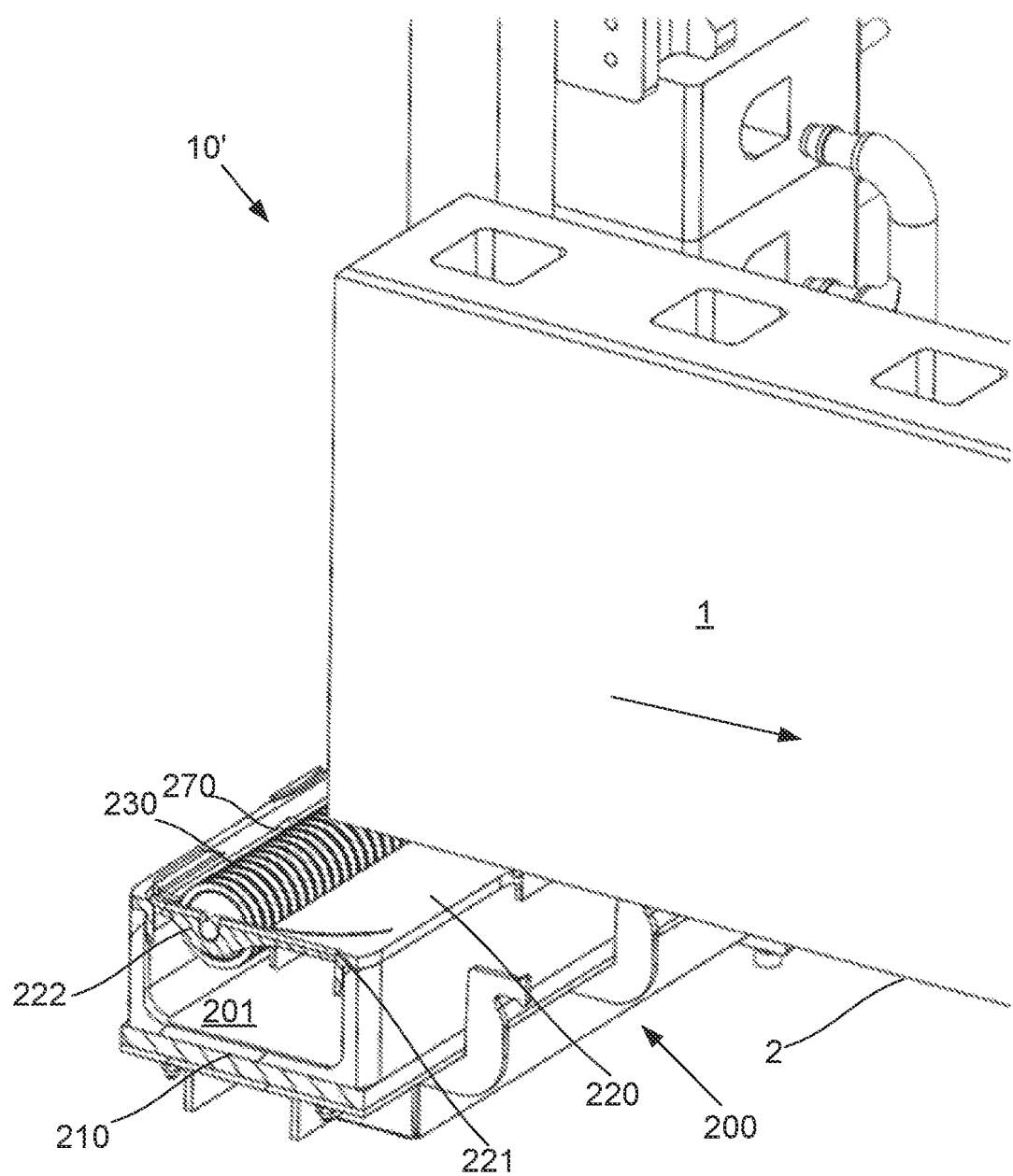
Figure 11F:
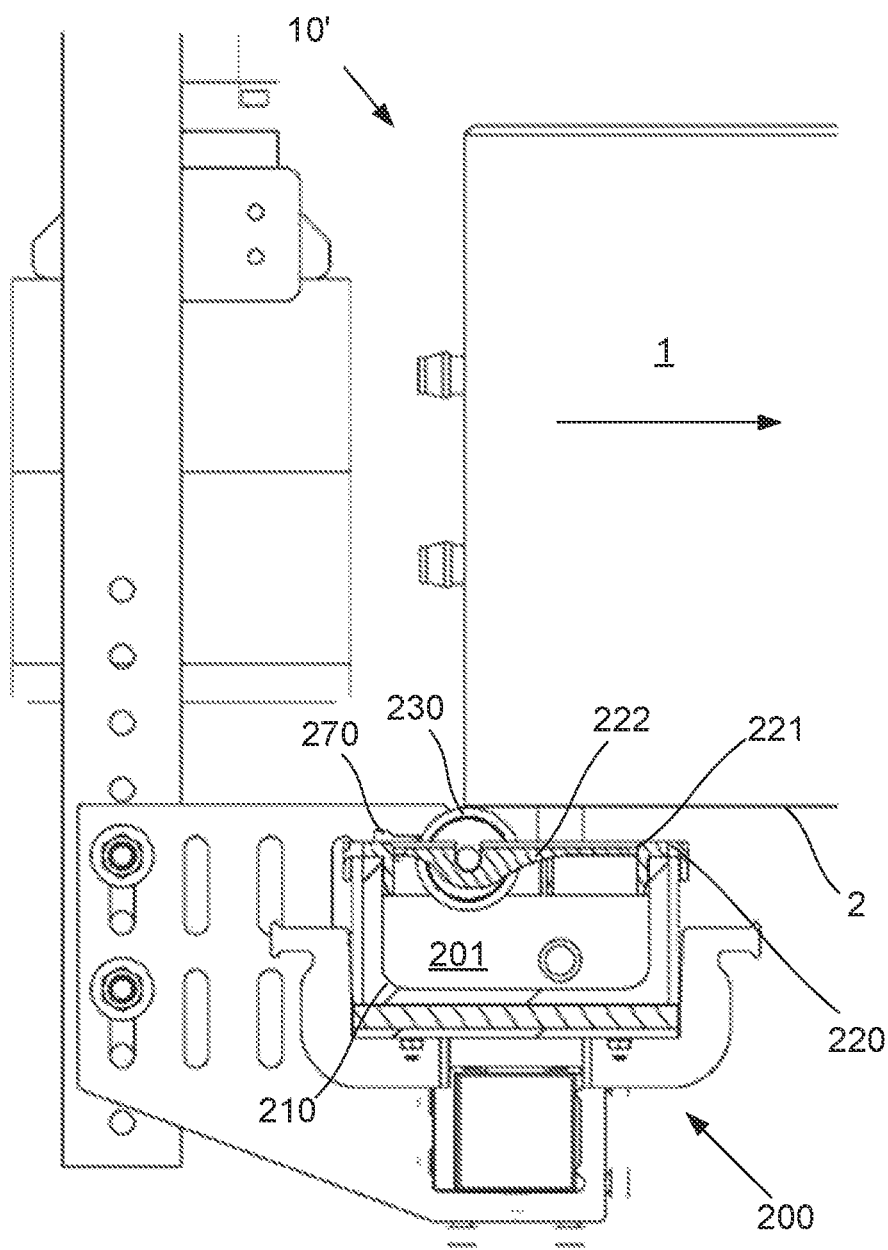
Figure 11G:
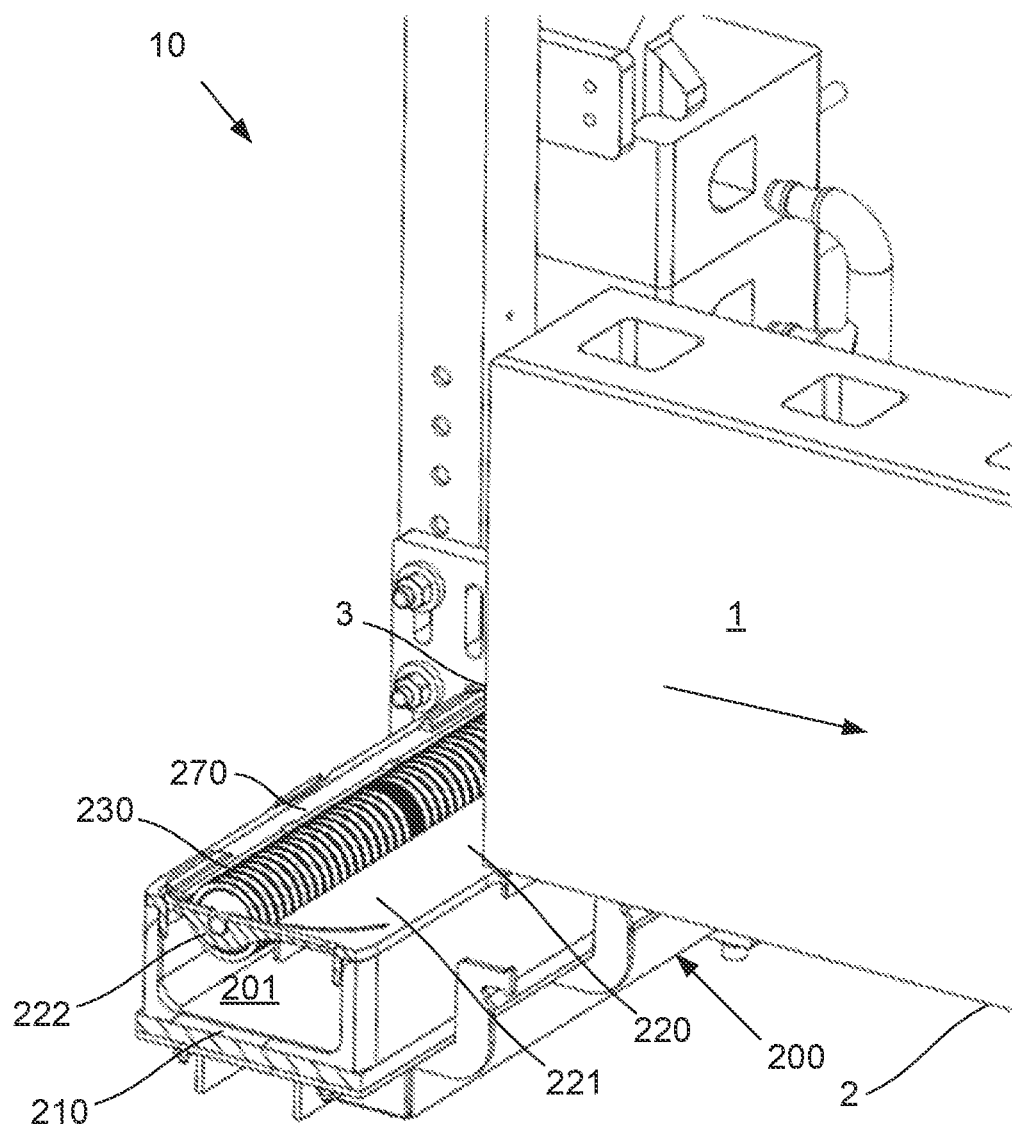
Figure 11H:
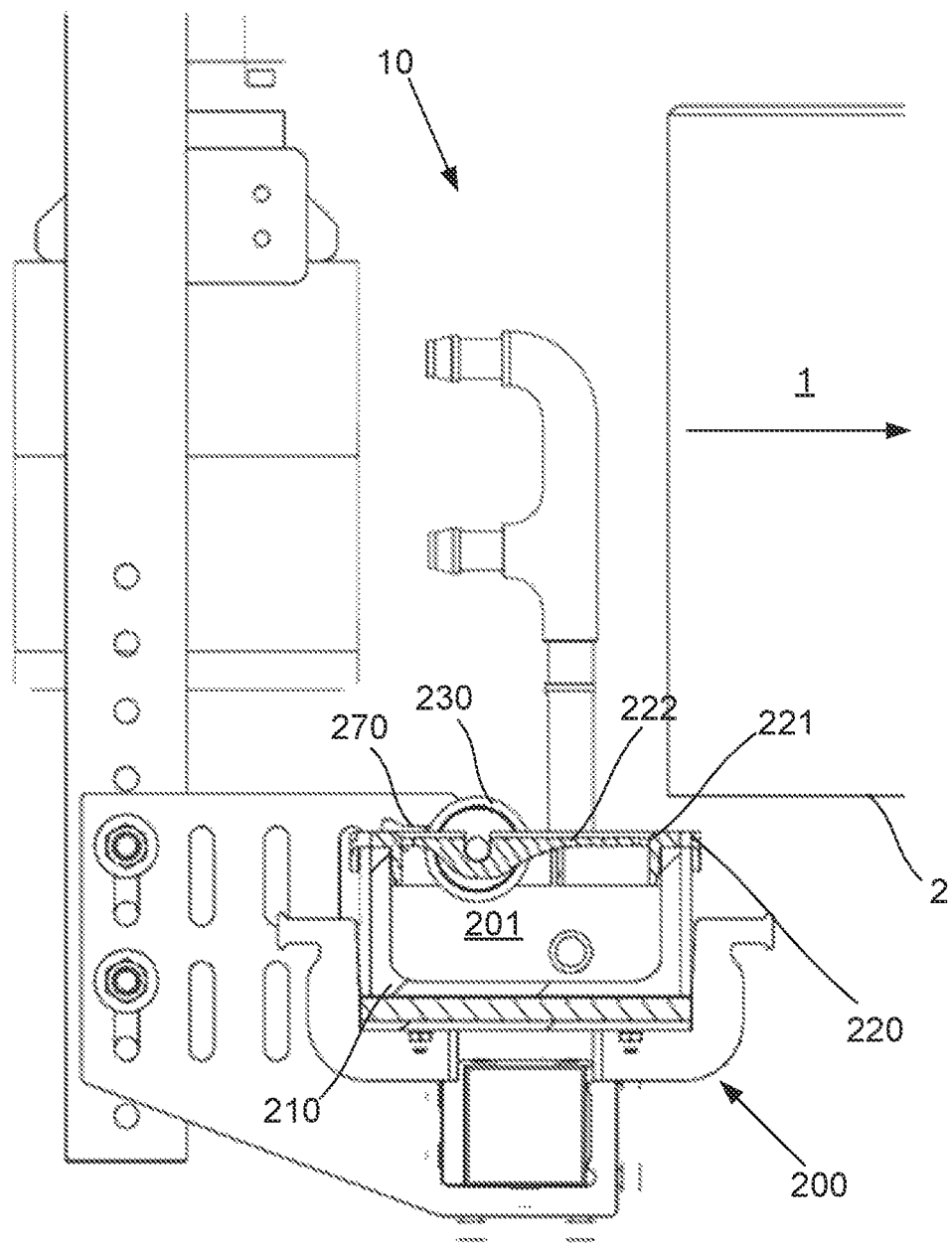
Figure 13A:
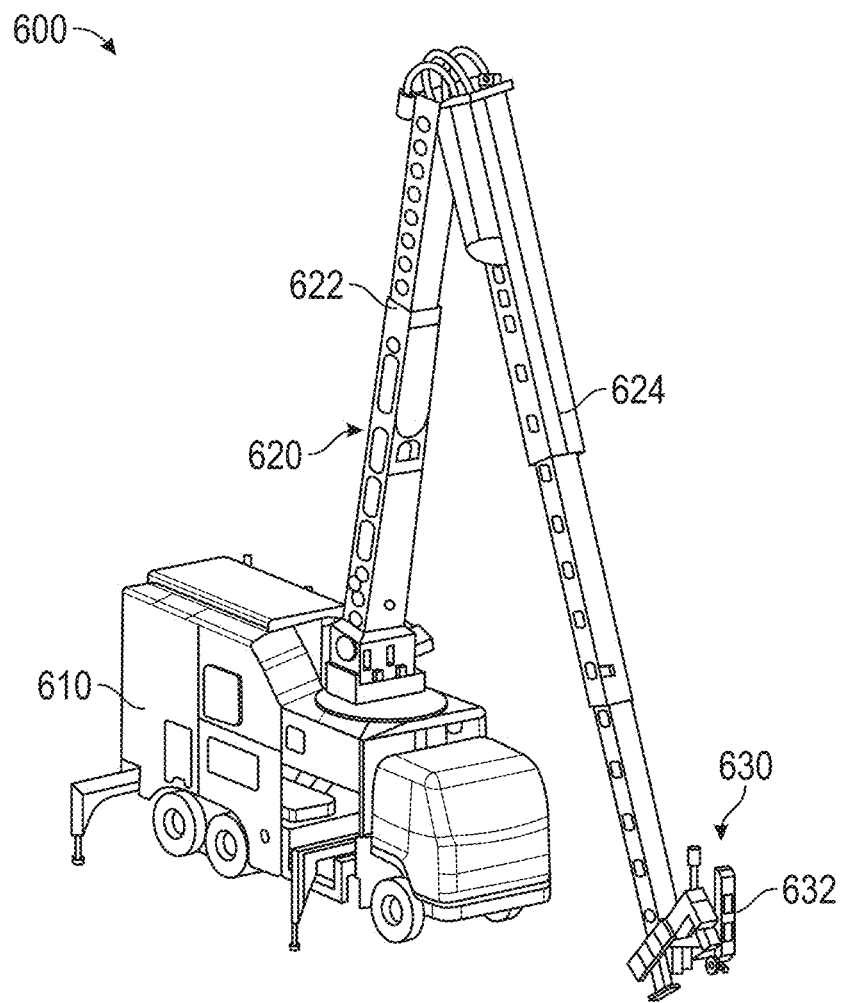
FIGS. 13A and 13B are perspective views of an automated block laying machine showing a boom in folded and extended positions.
Figure 13B:
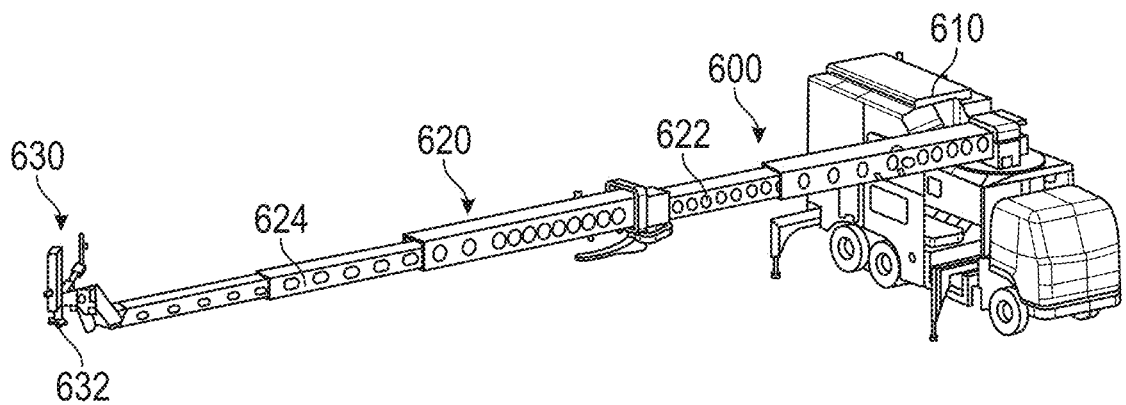
Figure 14:
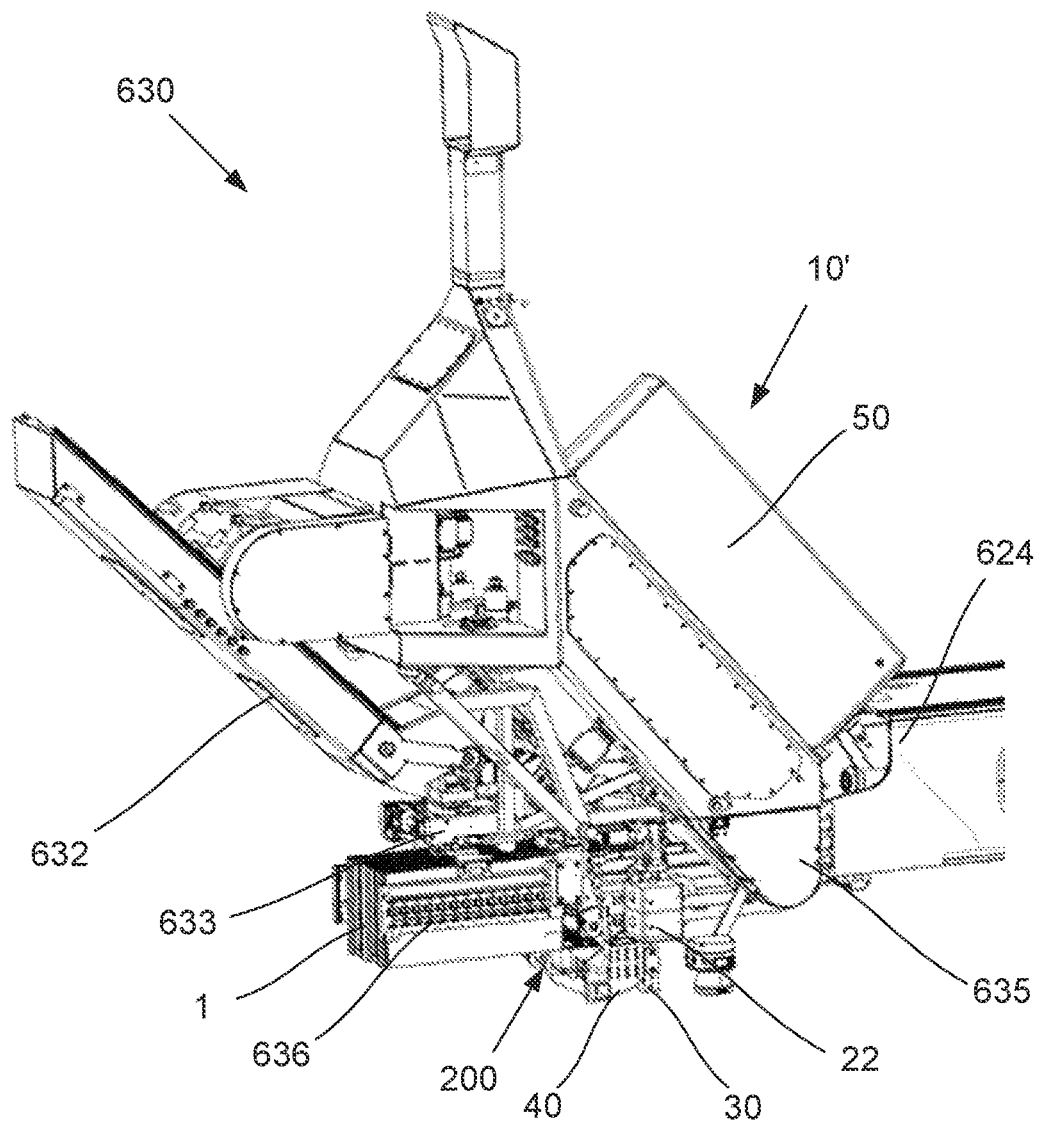
FIG. 14 is a perspective view of a block laying and adhesive applying head of an automated block laying machine including the adhesive application system of FIG. 1A.
Figure 15A:
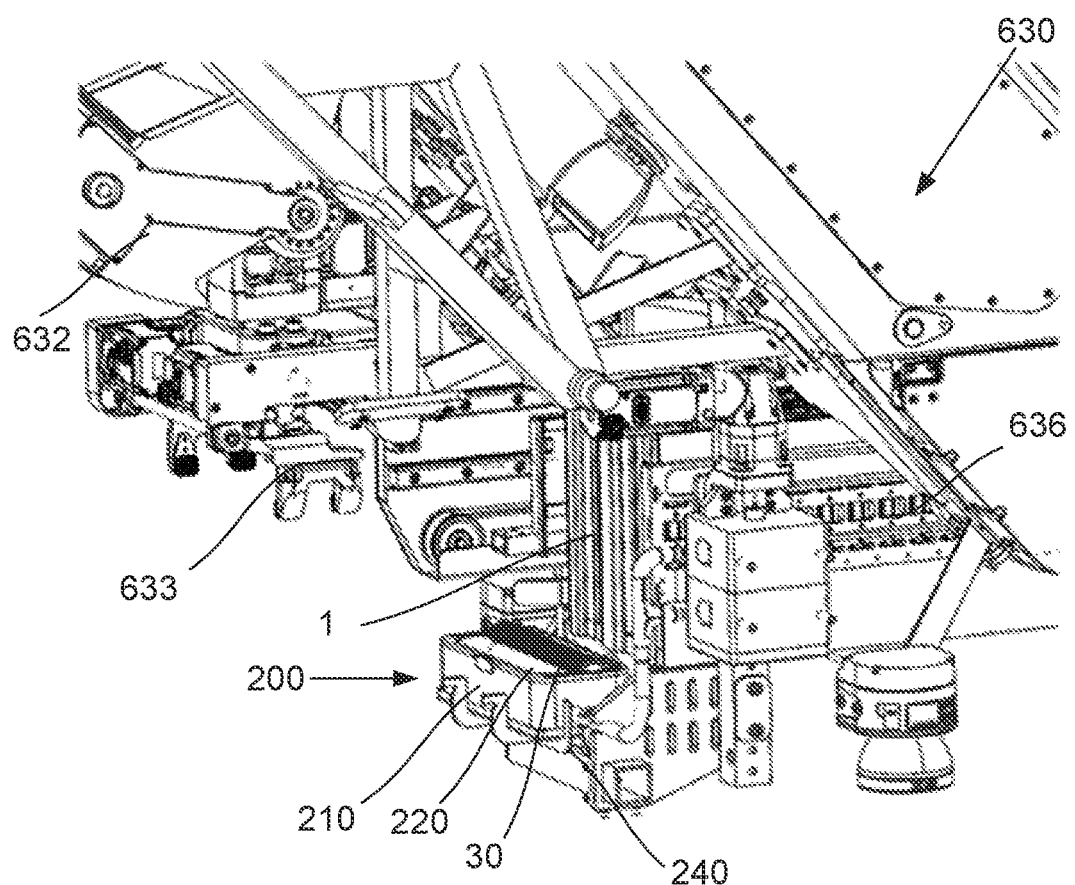
FIGS. 15A to 15C illustrate a sequence of perspective views of the block laying and adhesive applying head of FIG. 14 extending a block across the roller of the adhesive applicator.
Figure 15B:
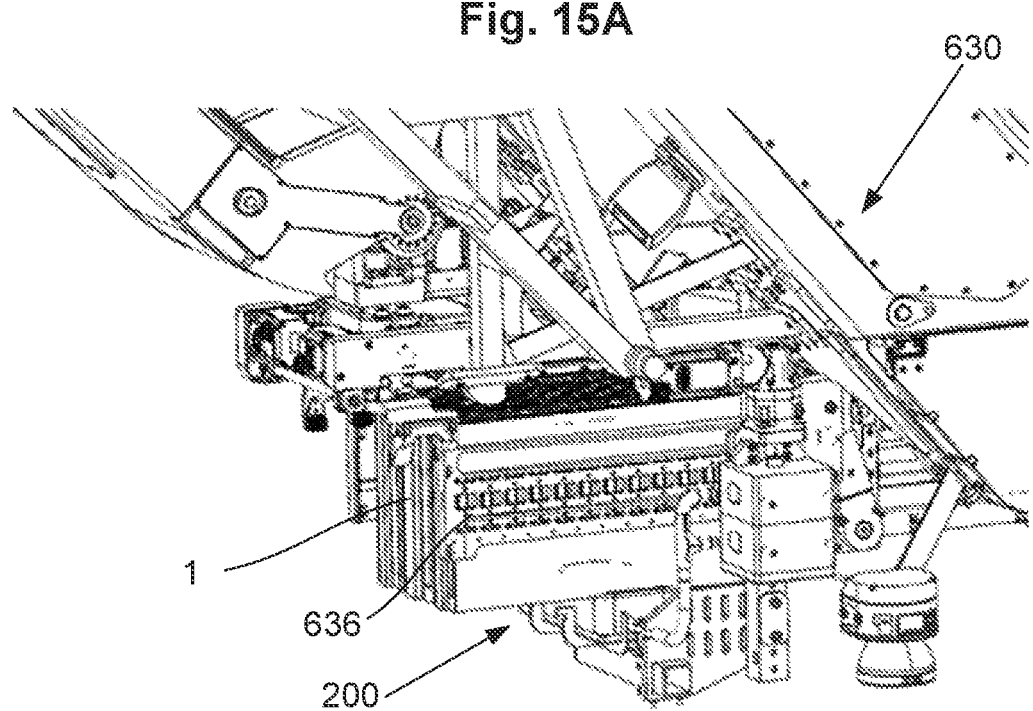
Figure 15C:
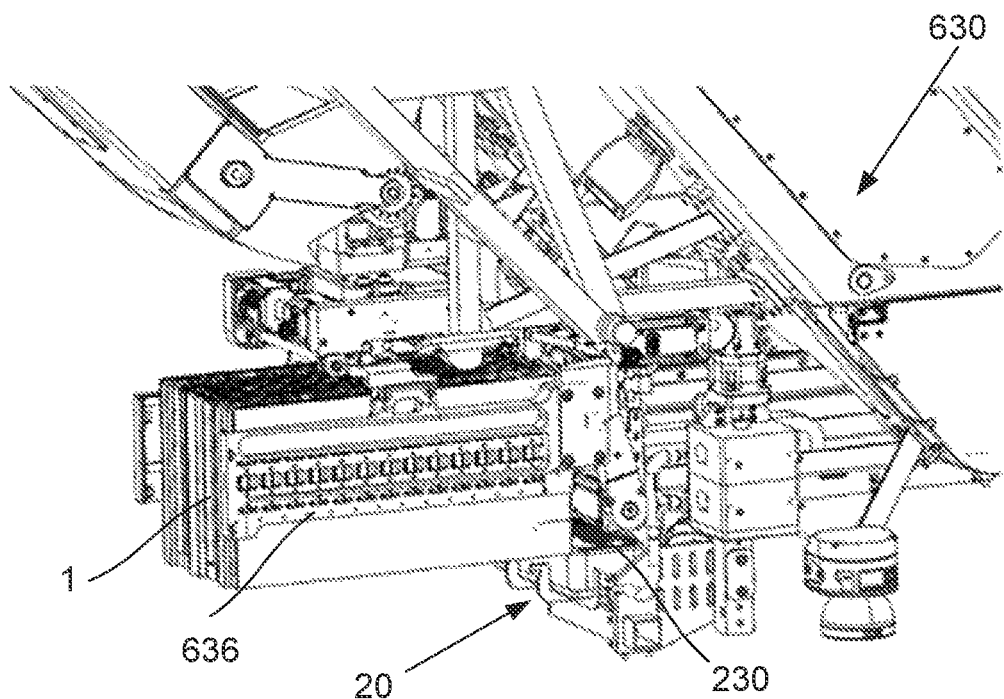

To maintain adhesive levels in the container 210 (to approximately +/2 mm) a load cell 262 is used as best shown in FIG. 10B. The load cell 262 sits beneath the container 210 and provide signal indicative of the mass of the container to a control system which then pumps adhesive into the container to maintain a mass of adhesive (and hence level) between programmable maximum and minimum levels. For the roller to work effectively, it needs to be at least partially submerged in the adhesive. As shown in FIG. 10B, the load cell 262 is positioned beneath the cradle 240 and used to monitor the weight of the adhesive in the reservoir 201 so as to maintain a programmed level of adhesive in the reservoir 201. Another option utilises a non-contact ultrasonic sensor to measure distance to the top of the adhesive or a capacitive sensor to determine a level of adhesive in the container.

Figure 6A:
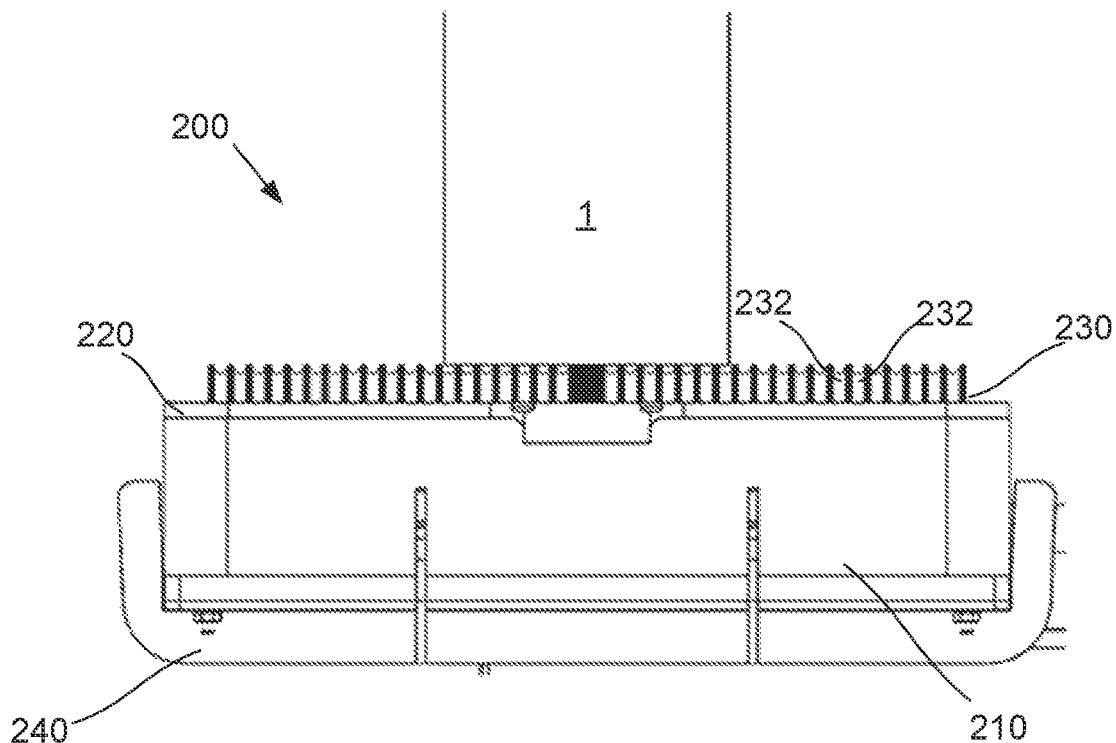
FIG. 6A is a front view of the adhesive applicator of FIG. 5A.
Figure 6B:
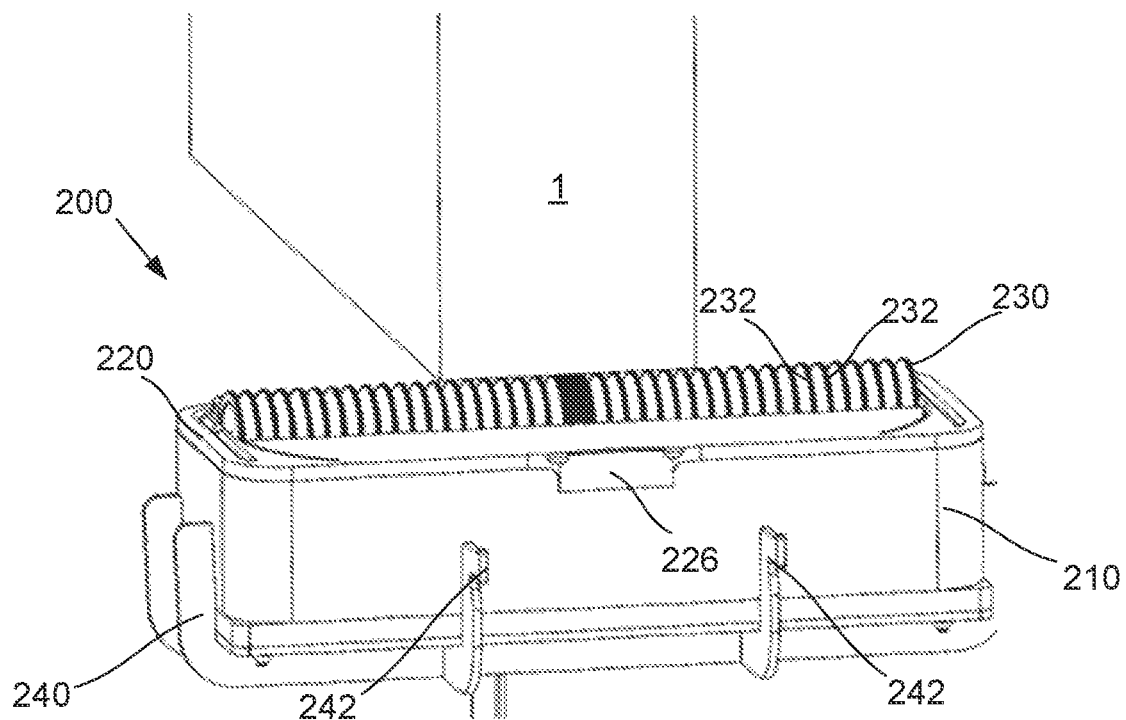
FIG. 6B is a perspective view of the adhesive applicator of FIG. 5A.
Figure 6C:
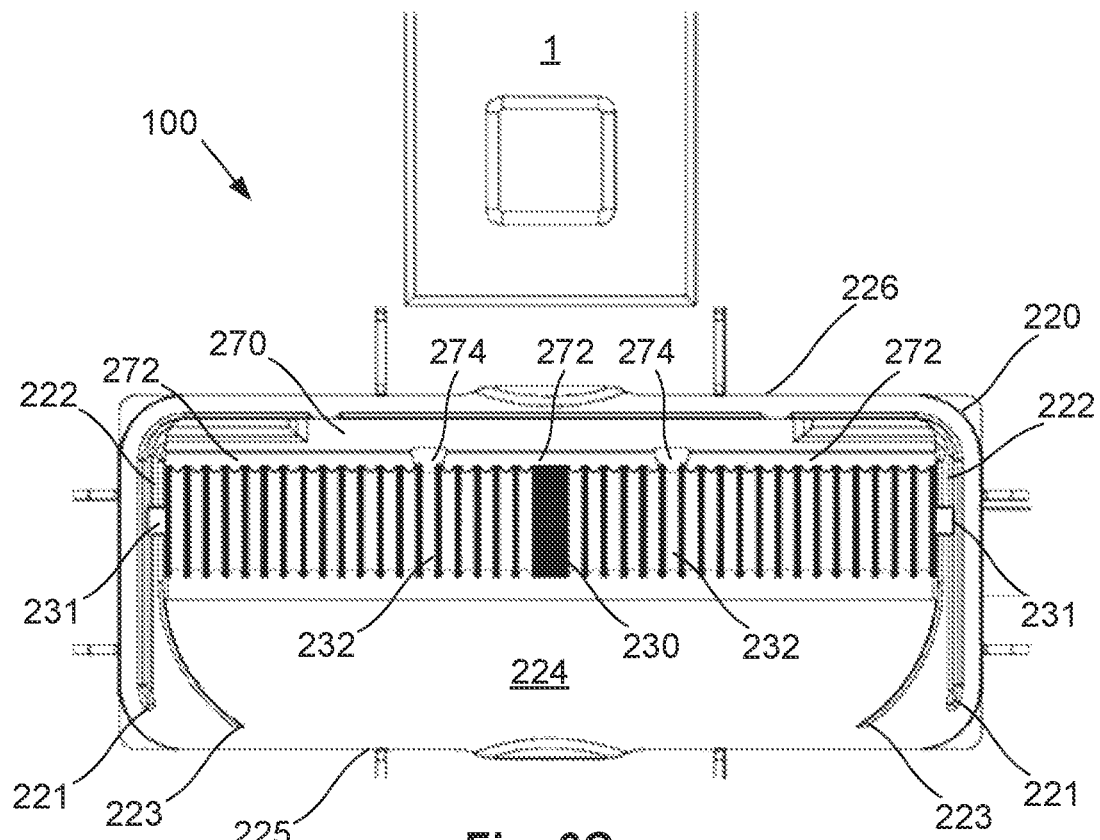
FIG. 6C is a top view of the adhesive applicator of FIG. 5A.
Figure 7:
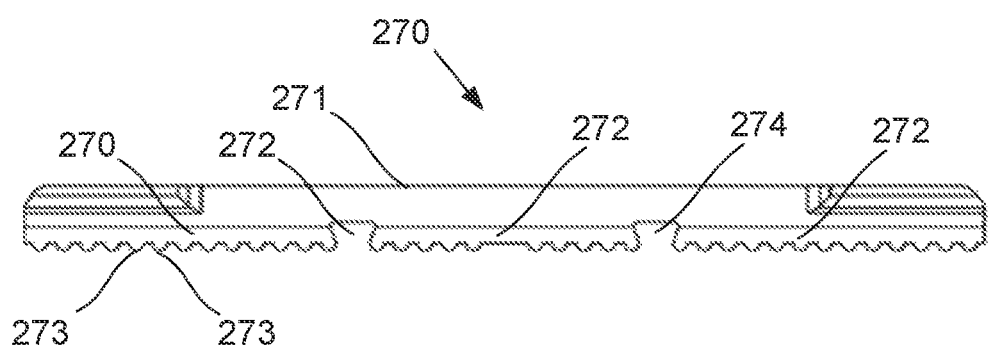
FIG. 7 is a top view of a scraper for use with the adhesive applicator.
Figure 8:
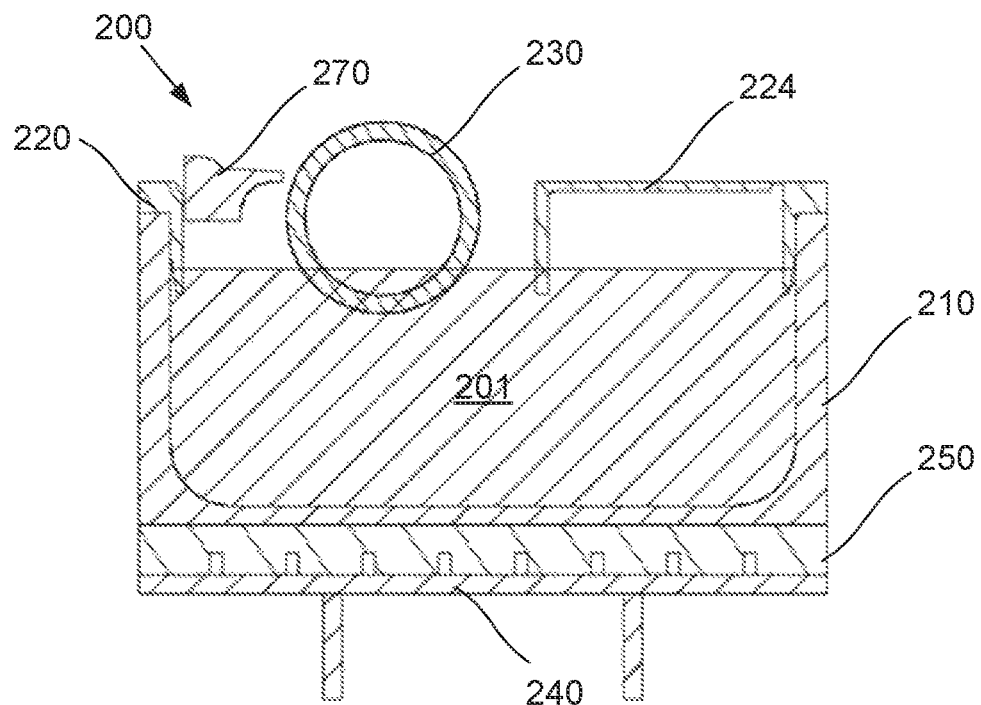
FIG. 8 is a cross-sectional view of the adhesive applicator.

Typically, one or both of the sprung roller arms 222 are coupled to the container 210 by an integral moulding that includes a built-in hinge or pivot 221 (see FIG. 6C) that allows the arms to flex or bend. In this regard, the arms act like flexibly resilient cantilever members. The moulding (which may be the lid 220) typically includes a peripheral slot that allows the moulding to be engaged onto a portion of an upper wall of the container. The built-in hinge or pivot 221 may be defined by a slot in the moulding having a terminal end proximate the base of each arm 222 about which the arm 222 can flex.

The adhesive roller may be provided in numerous forms. In the example shown in FIGS. 5A and 5B, the adhesive roller 230 has an elongate body having a plurality of circumferential grooves 232 spaced apart along the length of the body. Instead of grooves, the roller surface may alternatively be knurled or have some other kind of surface roughness or pattern applied to it which assists in both preventing roller slippage and providing a desired adhesive signature onto the block. In this example, a single roller is provided which extends substantially across the container 210.

Referring to FIGS. 6A to 6C and FIGS. 7 and 8, an example of a lid 220 is shown in more detail in which a scraper 270 is coupled to the pair of sprung roller arms 222 proximate a distal end thereof (proximate edge 226 of container 210), the scraper 270 having an elongate body 271 defining one or more ridged sections 272 including a plurality of ridges 273 operable to block particular grooves of the adhesive roller 230 and scrape adhesive therefrom. Additionally, one or more voids 274 are positioned between the ridged sections 272, the voids 274 providing areas where adhesive is able to be entrained onto the roller 230 to thereby define a pre-defined adhesive signature. The scraper 270 may be removable and adapted to suit the particular adhesive signature required by selectively allowing adhesive to be entrained onto certain areas of the roller 230. In one example, the scraper 270 is press fit between the distal ends 222C of the sprung roller arms 222. In another example, the lid may act as a mask around the leading edge of the roller, the distance of the edge of the mask away from the roller proportional to the amount of adhesive which is entrained onto the roller. The mask can therefore control the volume of adhesive picked up by the roller and assist in minimising the surface area of adhesive exposed to the environment.

Referring now to FIGS. 9A to 9D, it may be desirable to pre-load or tension the sprung roller arms 222. Once the scraper 270 has been assembled onto the roller arms 222, pre-tensioning may be achieved by manipulating the arms 222 and urging the scraper 270 beneath tabs 227 located along a lengthwise edge of the lid 220 (see FIG. 9D). This provides a pre-load when the roller is in contact with the brick to eliminate roller slippage.

Figure 9C:
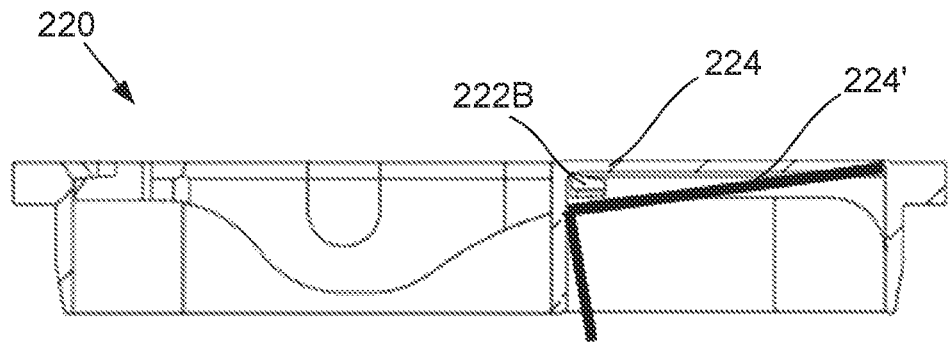
FIG. 9C is a cross-sectional view of the lid of FIG. 9A with drain element pushed down.
Figure 9D:
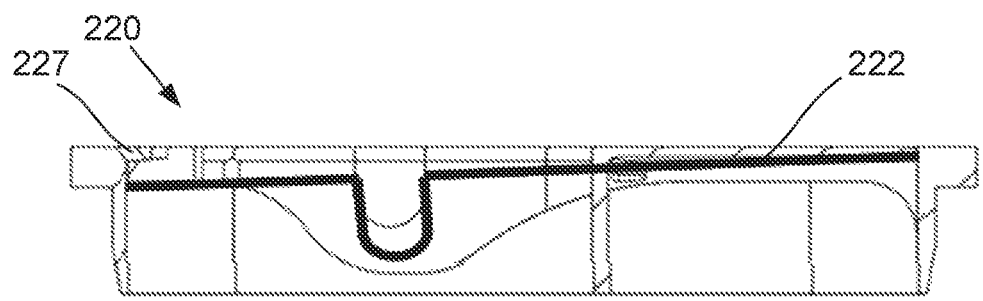
FIG. 9D is a cross-sectional view of the lid of FIG. 9A showing a sprung roller arm pushed down to provide a pre-load when the roller is in contact with the block.

The lid 220 is coupled to the container 210 in order to substantially conceal the reservoir 201. The lid 220 may include a pivotable cover 224 disposed between the pair of sprung roller arms 222 and extending towards the adhesive roller 230. The cover 224 is adapted to hinge about built-in pivot point 223. A distal end 224A of the pivotable cover 224 may be urged beneath tabs 222B disposed on the sprung roller arms 222 as shown in FIG. 9C so as to allow any unused adhesive on the surface of the cover 224 to drain back into the reservoir 201.

FIGS. 11A to 11H show FIGS. 11A to 11H provide a sequence of views illustrating a block 1 moving across the roller 230 of the adhesive applicator 200 to thereby apply adhesive to the bottom surface 2 of the block 1. In this example, the bottom surface 2 of the block 1 contacts the roller 230 in order to transfer the adhesive entrained on the roller onto the surface of the block. However, in alternative examples, since a laminar bead of adhesive having a thickness is entrained onto the roller, it is not necessary for there to be physical contact between the block and roller and a gap may be provided less than or equal to the thickness of the bead.

As the sprung roller arms 230 are compliant and able to hinge about pivot 221, as the block moves across the top of the roller, the roller may move up and down in a compliant fashion to conform to the block shape which may vary along its length.

Examples of block adhesive signatures are shown in FIGS. 12A to 12C. In FIG. 12A, a concrete masonry unit (CMU) block 300 is shown of cuboid form having sides 301, 303 and ends 304, 305 and a plurality of cores 306 spaced lengthwise along the block. Two parallel beads of adhesive 301, 312 are applied lengthwise along the bottom surface 302 of the block adjacent sides 301, 303. In FIG. 12B, a slightly wider CMU block 400 is shown having sides 401,403 and ends 404, 405 and a plurality of cores 406 spaced lengthwise along the block. Two parallel beads of adhesive 410, 420 are applied lengthwise along the bottom surface 402 of the block adjacent sides 401, 403. Adhesive is also applied to the ribs between the cores 406 as depicted by beads 430, 440. These additional beads provide greater adhesion across the width of the block for a wider block such as this. Finally, in FIG. 12C a clay block 500 is shown having a complex core arrangement. Block 500 is shown having sides 501, 503 and ends 504, 505 and a plurality of cores 506. Four parallel beads of adhesive 510, 520, 530 and 540 are applied lengthwise along the bottom surface 502 of the block along longitudinal ribs or stiffeners. These different adhesive signatures are formed by rollers having roller elements spaced apart at different intervals with variable roller element widths dependent on block type.

In this regard, the adhesive roller may include an elongate shaft and a plurality of spaced apart roller elements coupled to the shaft. The roller elements are typically cylindrical and include a plurality of circumferential grooves. Optionally, the roller elements may be spaced apart by spacer elements and configured as appropriate in order to obtain the desired adhesive signature for a particular block type.

In yet a further example, the adhesive roller includes alternating roller and spacer elements coupled to the shaft and wherein the spacer elements have a diameter less than the roller elements. In this example, the roller and spacer elements would be thin discs that are arranged so that the spacers act like grooves. In accordance with the above examples, the adhesive roller may be reconfigured using a standard set of roller and/or spacer elements as appropriate in order to achieve a desired adhesive signature.

Figure 17A:
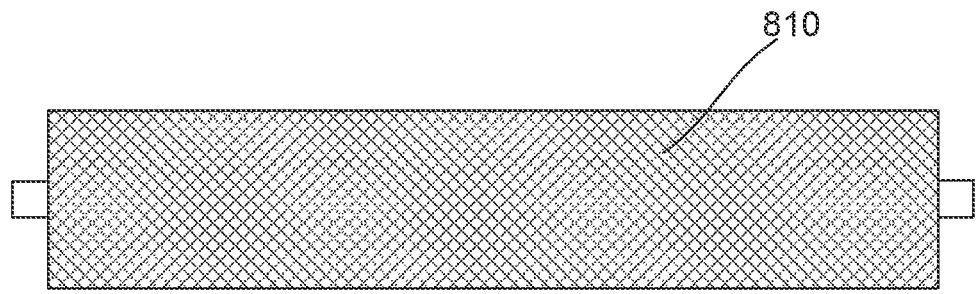
FIG. 17A is a schematic top view of a further example of an adhesive roller.
Figure 17B:
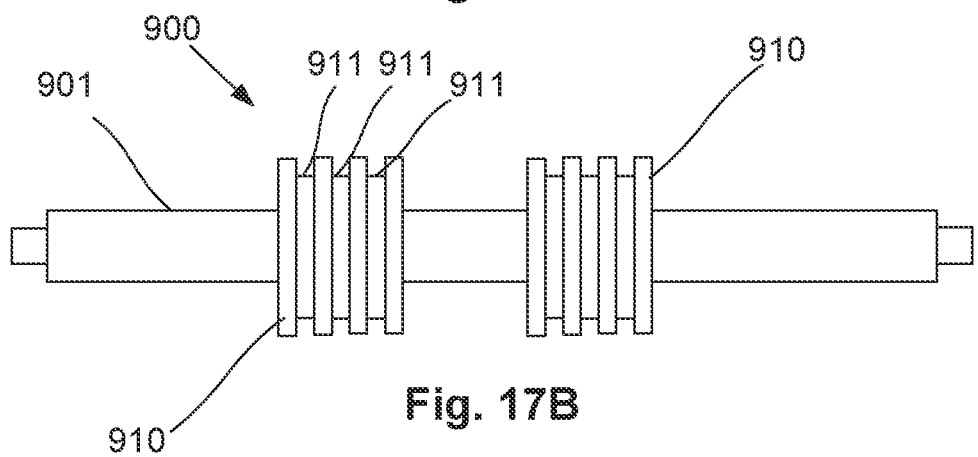
FIG. 17B is a schematic top view of a further example of an adhesive roller.
Figure 17C:
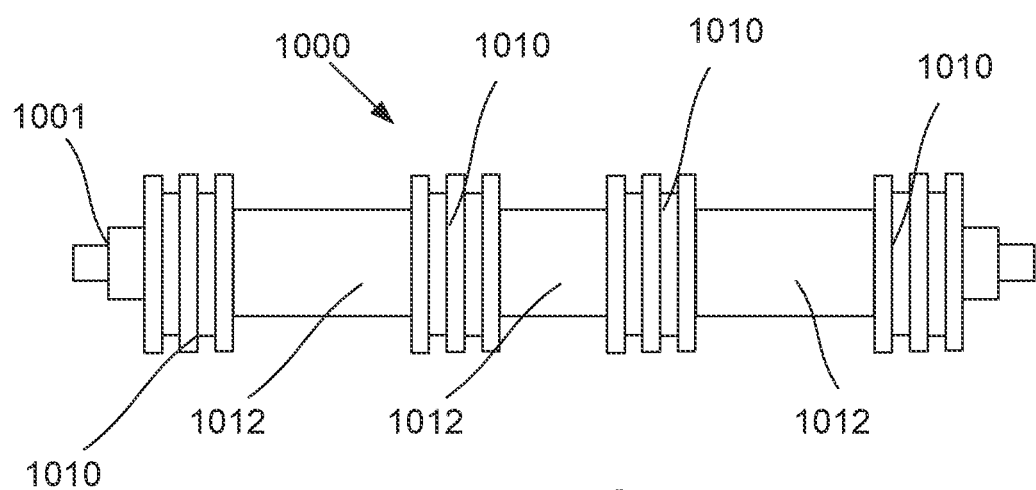
FIG. 17C is a schematic top view of a further example of an adhesive roller.
Figure 17D:
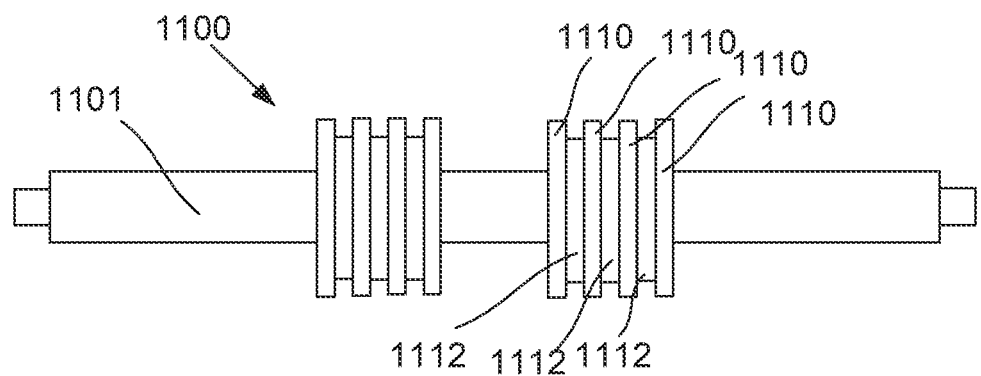
FIG. 17D is a schematic top view of a further example of an adhesive roller.
Figure 17E:
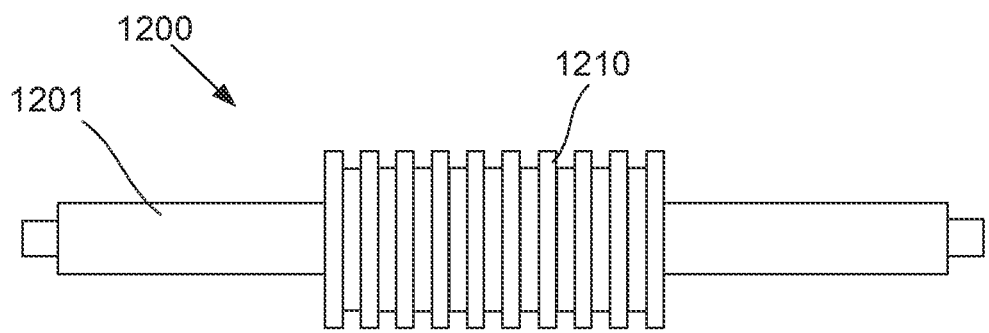
FIG. 17E is a schematic top view of yet a further example of an adhesive roller; and, FIG. 17F is a schematic top view of the adhesive roller of FIG. 17E shown beneath a lid which masks the leading edge of the roller.
Figure 17F:
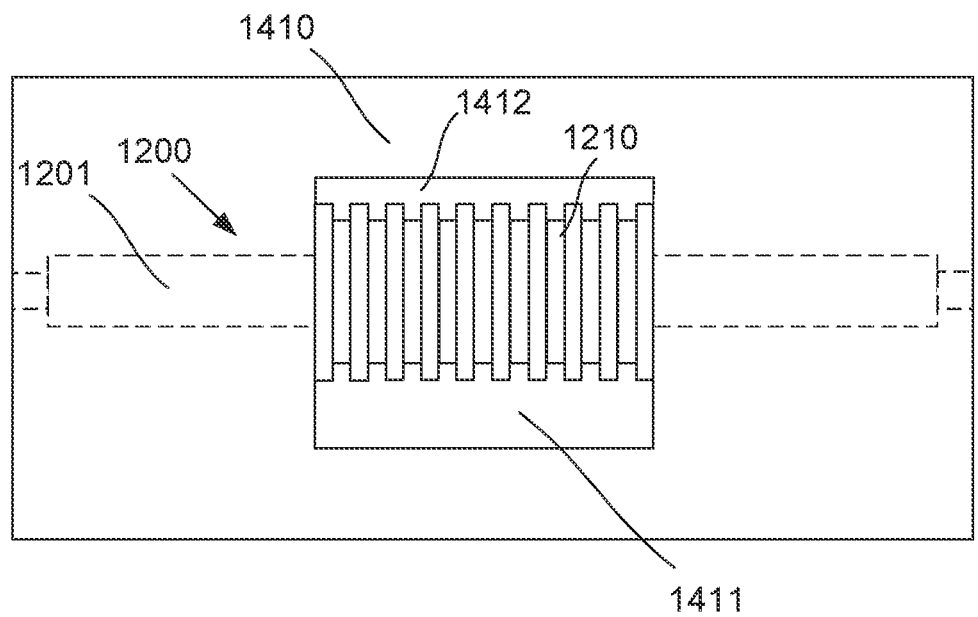

Examples of alternative roller configurations are provided in FIGS. 17A to 17F. In FIG. 17A, there is shown an elongate cylindrical roller having a knurled body 810. In FIG. 17B, there is shown a roller 900 having an elongate shaft 901 and a pair of spaced apart roller elements 910 each with a plurality of spaced circumferential grooves 911. In FIG. 17C, there is shown a roller 1000 having an elongate shaft 1001, and a plurality of spaced apart roller elements 1010 that are separated by spacer tubes 1012. In FIG. 17D, there is shown a roller 1100 having an elongate shaft 1101 and a plurality of thin roller elements 1110 separated by thin spacers 1112. FIG. 17D shows a roller 1200 having an elongate shaft 1201 and a central roller element 1210 which is intended to be masked as shown in FIG. 17E by lid 1410 which acts as a mask around the leading edge 1412 of the roller, the distance of the edge of the mask away from the roller proportional to the amount of adhesive which is entrained onto the roller. The mask can therefore control the volume of adhesive picked up by the roller and assist in minimising the surface area of adhesive exposed to the environment.

The above described adhesive system is for use with an automated block laying machine 600 as shown in FIGS. 13A and 13B and FIGS. 14 and 15A to 15C. The automated block laying machine 600 may include a base 610 (such as a truck or other vehicle). A telescopically extendable and foldable boom 620 for conveying blocks is rotatably coupled to the base and boom section 622 and 624 are coupled about a pivot joint. A block laying and adhesive applying head 630 is mounted to the distal end of the boom 620 and having a block laying robot arm 632 and end effector 633 for placing a block in a desired position. A block transfer apparatus 636 clamps a block 1 received from the distal end of the boom 620 and linearly extends it across the adhesive applicator 200 mounted to the head 630 as shown in FIGS. 14 and 15A to 15C. The adhesive supply 50 is shown mounted to the side 635 of the head 630. In this way, adhesive is applied to the bottom surface of the block 1 before the laying robot 632 picks up the block and lays it.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

I claim:

1. An adhesive application system for an automated block laying machine, the adhesive application system including:
    an adhesive supply;
    an adhesive applicator including:
        a container for storing an adhesive reservoir received from the adhesive supply;
        a lid mounted to the container so as to substantially cover the adhesive reservoir; and,
        an adhesive roller rotatably coupled to the container and configured to be at least partially submerged in the adhesive reservoir so that upon rotation adhesive from the adhesive reservoir is entrained up and around at least a portion of the adhesive roller, and
    an adhesive supply line connected to and movable with the container, wherein the adhesive supply line is configured to receive adhesive from the adhesive supply and convey the received adhesive to the container,
    wherein, in use, adhesive is transferred from the adhesive roller onto a bottom surface of a block as the block is moved across the adhesive roller.

2. The adhesive application system according to claim 1, wherein the adhesive supply is configured to provide adhesive to the adhesive applicator via a gravity feed.

3. The adhesive application system according to claim 2, wherein the adhesive supply is a canister having:
an opening to allow the canister to be at least partially filled with adhesive; and,
a removable cap that seals the opening and is configured to be in fluid communication with the adhesive supply line;
wherein, in use, the canister is oriented so that the cap is facing downward and adhesive is able to flow by gravity through the cap and into the supply line.

4. The adhesive application system according to claim 3, wherein the adhesive supply line includes a valve which is openable to allow flow of an amount of adhesive into the container of the adhesive applicator.

5. The adhesive application system according to claim 4, wherein the valve is configured to be actuated by a motor so as to selectively open in order to meter the amount of adhesive supplied to the container.

6. The adhesive application system according to claim 5, wherein the motor is coupled to a reduction gearbox to increase torque for actuating the valve.

7. The adhesive application system according to claim 4, wherein the adhesive application system is configured to monitor the amount of adhesive in the container via:
a level sensor configured to provide a signal to a controller indicative of the level of adhesive in the container; and/or,
a mass sensor configured to provide a signal to a controller indicative of the mass of the container.

8. The adhesive application system according to claim 7, wherein:
the level sensor is a capacitive sensor mounted to a side of the container; and/or,
the mass sensor is a load cell mounted beneath the container.

9. The adhesive application system according to claim 1, wherein:
the adhesive application system is configured to heat the adhesive prior to application; and/or,
a heating element is provided at a base of the container.

10. The adhesive application system according to claim 1, wherein the adhesive roller includes:
an elongate shaft having axles rotatably coupled to opposing ends of the container; and,
one or more roller elements coupled to or integral with the shaft.

11. The adhesive application system according to claim 10, wherein:
in use, the one or more roller elements are at least partially submerged in the adhesive reservoir; and/or,
the one or more roller elements at least partially protrude above the lid through openings therein.

12. The adhesive application system according to claim 10, wherein:
the one or more roller elements are circular discs or wheels; and/or,
the one or more roller elements have at least one circumferential groove formed therein.

13. The adhesive application system according to claim 10, wherein the adhesive roller is configured to be driven by a motor coupled to the elongate shaft via a coupling element.

14. The adhesive application system according to claim 10, wherein the adhesive roller is configured to entrain a bead of adhesive onto the one or more roller elements as the shaft rotates and to transfer the bead of adhesive onto the block as the block moves across the adhesive roller, and wherein the one or more roller elements of the adhesive roller are configured to contact the block and/or provide a gap between the block and the one or more roller elements that is less than or equal to the thickness of the bead of adhesive.

15. The adhesive application system according to claim 1, wherein the adhesive application system is mounted to a block laying and adhesive applying head of an automated block laying machine, the head located at a distal end of a telescopingly extendable and foldable boom for conveying blocks therealong.

16. The adhesive application system according to claim 15, wherein the adhesive applicator is adjustably mounted to the head via a support post and bracket.

17. A block laying and adhesive applying head for an automated block laying machine, the head mountable to a distal end of a telescopingly extendable and foldable boom for conveying blocks therealong, the head including an adhesive application system including:
an adhesive supply; and;
an adhesive applicator including:
a container for storing an adhesive reservoir received from the adhesive supply;
a lid mounted to the container so as to substantially cover the adhesive reservoir; and,
an adhesive roller rotatably coupled to the container and configured to be at least partially submerged in the adhesive reservoir so that upon rotation adhesive from the adhesive reservoir is entrained up and around at least a portion of the adhesive roller, and
an adhesive supply line connected to and movable with the container, wherein the adhesive supply line is configured to receive adhesive from the adhesive supply and convey the received adhesive to the container,
wherein, in use, adhesive is transferred from the adhesive roller onto a bottom surface of a block as the block is moved across the adhesive roller.

18. The block laying and adhesive applying head according to claim 17, wherein the head includes a block transfer apparatus for transferring a block from a distal end of the boom to a robotic arm having an end effector which grips and lays the block at a predetermined spatial position and orientation, the block transfer apparatus configured to clamp the block and linearly extend the block across the adhesive roller before the block is transferred to the robotic arm and laid.

19. The block laying and adhesive applying head according to claim 17, the head further including:
a support mountable to the boom, wherein the adhesive application system is mounted to the support;
a robotic arm having an end effector operable to grip and lay blocks at a predetermined spatial position and orientation; and,
a block transfer apparatus for transferring a block from the distal end of the boom to the robotic arm,
wherein, in use, adhesive is transferred from the adhesive roller onto the bottom surface of the block as the block transfer apparatus linearly extends the block across the roller.

20. An automated block laying machine, including:
a base;
a telescopingly extendable and foldable boom rotatably mounted from the base for conveying blocks therealong; and, a block laying and adhesive applying head, the head mountable to a distal end of the boom, the head including:
  a support mountable to the boom;
  a robotic arm having an end effector operable to grip and lay blocks at a predetermined spatial position and orientation;
  a block transfer apparatus for transferring a block from the distal end of the boom to the robotic arm; and,
  an adhesive application system mounted to the support including:
    an adhesive supply;
    an adhesive applicator including:
      a container for storing an adhesive reservoir received from the adhesive supply;
      a lid mounted to the container so as to substantially cover the adhesive reservoir; and,
      an adhesive roller rotatably coupled to the container and configured to be at least partially submerged in the adhesive reservoir so that upon rotation adhesive from the adhesive reservoir is entrained up and around at least a portion of the adhesive roller; and
    an adhesive supply line connected to and movable with the container wherein the adhesive supply line is configured to receive adhesive from the adhesive supply and convey the received adhesive to the container,
wherein, in use, adhesive is transferred from the adhesive roller onto a bottom surface of a block as the block transfer apparatus linearly extends a block across the adhesive roller.

21. An adhesive application system for an automated block laying machine, the adhesive application system including:
  an adhesive supply; and;
  an adhesive applicator including:
    a container for storing an adhesive reservoir received from the adhesive supply;
    a lid mounted to the container so as to substantially cover the adhesive reservoir, the lid having one or more openings therein; and,
    an adhesive roller rotatably coupled to the container and including one or more roller elements configured to be at least partially submerged in the adhesive reservoir so that upon rotation adhesive from the adhesive reservoir is entrained up and around at least a portion of the one or more roller elements, and
  an adhesive supply line connected to and movable with the container, wherein the adhesive supply line is configured to receive adhesive from the adhesive supply and convey the received adhesive to the container,
  wherein the one or more roller elements at least partially protrude above the lid through the one or more openings of the lid so that, in use, adhesive is transferred from the adhesive roller onto a bottom surface of a block as the block is moved across the lid and the one or more roller elements.

* * * * *